US012496745B2

(12) United States Patent
Testi et al.

(10) Patent No.: US 12,496,745 B2
(45) Date of Patent: Dec. 16, 2025

(54) METHOD AND SYSTEM TO MANUFACTURE CERAMIC ARTICLES

(71) Applicant: SACMI COOPERATIVA MECCANICI IMOLA SOCIETA' COOPERATIVA, Imola (IT)

(72) Inventors: Paolo Testi, Imola (IT); Angelantonio Onorato, Imola (IT)

(73) Assignee: SACMI COOPERATIVA MECCANICI IMOLA SOCIETA' COOPERATIVA, Imola (IT)

(*) Notice: Subject to any disclaimer, the term of this patent is extended or adjusted under 35 U.S.C. 154(b) by 125 days.

(21) Appl. No.: 18/550,947

(22) PCT Filed: Mar. 18, 2022

(86) PCT No.: PCT/IB2022/052478
§ 371 (c)(1),
(2) Date: Sep. 15, 2023

(87) PCT Pub. No.: WO2022/195547
PCT Pub. Date: Sep. 22, 2022

(65) Prior Publication Data

US 2024/0165849 A1 May 23, 2024

(30) Foreign Application Priority Data

Mar. 18, 2021 (IT) ........................ 102021000006482
Mar. 18, 2021 (IT) ........................ 102021000006485

(51) Int. Cl.
*B28B 13/02* (2006.01)
*B28B 1/00* (2006.01)
(Continued)

(52) U.S. Cl.
CPC ............ *B28B 13/022* (2013.01); *B28B 1/005* (2013.01); *B28B 1/008* (2013.01); *B28B 5/027* (2013.01);
(Continued)

(58) Field of Classification Search
CPC ....... B28B 13/022; B28B 1/005; B28B 1/008; B28B 5/027
See application file for complete search history.

(56) References Cited

U.S. PATENT DOCUMENTS

2004/0247400 A1 12/2004 Cloue et al.
2019/0217501 A1 ‡ 7/2019 Ricci ..................... B30B 15/308
(Continued)

FOREIGN PATENT DOCUMENTS

CN 207310207 5/2018
CN 108214850 6/2018
(Continued)

OTHER PUBLICATIONS

International Preliminary Report on Patentability received for PCT Patent Application No. PCT/IB2022/052478, mailed on Sep. 28, 2023, 12 pages.
(Continued)

*Primary Examiner* — Jacob T Minskey
*Assistant Examiner* — Virak Nguon
(74) *Attorney, Agent, or Firm* — Workman Nydegger

(57) ABSTRACT

System for manufacturing ceramic articles, in particular ceramic slabs or tiles, comprising: a compaction device; a conveyor assembly to transport powder material along a given path from an input station to an output station; a digital feeding assembly to feed powder material to the conveyor assembly at the input station so as to generate a layer of powder material, with feeding devices each comprising a plurality of distribution elements along its transverse output
(Continued)

mouth, as well as corresponding actuators; a detection unit to detect the height or thickness of the powder material; and a height correction unit, located upstream of the detection unit and of the compaction device, operable to modify the height or thickness of the layer of powder material crosswise to said moving direction, depending on the data detected by said detection unit, so as to make it more uniform.

19 Claims, 17 Drawing Sheets

(51) Int. Cl.
*B28B 5/02* (2006.01)
*B28B 17/00* (2006.01)

(52) U.S. Cl.
CPC ...... *B28B 13/0295* (2013.01); *B28B 17/0081* (2013.01)

(56) References Cited

U.S. PATENT DOCUMENTS

| | | | |
|---|---|---|---|
| 2019/0240864 | A1 | 8/2019 | Ursella |
| 2020/0039108 | A1 | 2/2020 | Scardovi |

FOREIGN PATENT DOCUMENTS

| | | | | | |
|---|---|---|---|---|---|
| CN | 108943361 | | | 12/2018 | |
| CN | 109986689 | | | 7/2019 | |
| CN | 111203969 | | | 5/2020 | |
| CN | 111702939 | | | 9/2020 | |
| CN | 111702939 | A | ‡ | 9/2020 | ........... B28B 11/001 |
| EP | 1641607 | | | 4/2006 | |
| JP | H0999415 | | | 4/1997 | |
| RU | 2298516 | C2 | | 5/2007 | |
| WO | 2009118611 | | | 10/2009 | |
| WO | 2021005475 | | | 1/2021 | |

OTHER PUBLICATIONS

Office Action received for Russian Patent Application No. 2023124456, mailed on Feb. 21, 2024, 9 pages.
Italian Priority Search Report completed Nov. 23, 2021 for IT2021/00006485.
Italian Priority Search Report completed Nov. 22, 2021 for IT2021/00006482.
PCT Search Report completed Jul. 18, 2022 for PCT/IB2022-052478.

‡ imported from a related application

METHOD AND SYSTEM TO MANUFACTURE CERAMIC ARTICLES

CROSS-REFERENCE TO RELATED APPLICATIONS

The present invention is a 35 U.S.C. § 371 U.S. National Stage of PCT Application No. PCT/IB2022/052478, filed on Mar. 18, 2022, which claims priority to Italian patent applications no. 102021000006482 and no. 102021000006485 filed on Mar. 18, 2021 The entire content of each aforementioned patent applications is incorporated herein by reference.

TECHNICAL FIELD

The present invention relates to a system to manufacture ceramic articles and to a method to manufacture ceramic articles; in particular, ceramic slabs and tiles; even more particularly, ceramic slabs and tiles having internal streaks or veins.

BACKGROUND OF THE INVENTION

In the field of the production of ceramic articles, there is an increasing need to manufacture ceramic articles, such as ceramic slabs and tiles, whose aesthetic appearance most faithfully reproduces the appearance of natural stones, such as marble, granite, etc., or wood.

In particular, the attempt made is to reproduce the pattern that characterises natural stones or wood, which typically has a main background colour and a series of streaks/veins of different colours and shapes that develop randomly within the thickness of the background colour so that they are visible both on the external surface of the final ceramic articles and on the edges; in these cases we talk about “passing-through veins”.

Some of the known systems and methods to manufacture ceramic articles, for example those described in patent documents WO 2021/005475 and IT20190011025 (of the same applicant), provide for feeding a certain type (colour) of ceramic powder material onto a conveyor assembly, by means of a feeding device, so as to create a base layer, for sucking part of said base layer so as to create grooves at the parts where the “passing-through veins” are to be formed, and for introducing, by means of further feeding devices, a ceramic powder material of a different type (colour) into said grooves so as to form a layer of ceramic powder material reproducing a desired pattern. However, the layer of ceramic powder material formed in this way may present unevenness in thickness, induced for example by the type of feeding devices used to feed the ceramic powder material and/or by defects in coordination between the moving speed of the conveyor assembly and the operation of the feeding devices and/or by the shape of the veins/streaks intended to be manufactured, in fact, as the width of the veins/streaks and the longitudinal development of such veins/streaks increase, the unevenness increases.

Such thickness unevenness can, however, create problems during compaction of the layer of ceramic powder material, inducing an abnormal tension state and/or uneven density in the layer of compacted powder material. This compromises the aesthetic appearance of the final ceramic articles and may also cause damage to the final ceramic articles themselves, e.g. during firing.

Precisely in an attempt to overcome these drawbacks, some known methods and systems to manufacture ceramic articles provide that the layer of ceramic powder material reproducing the desired pattern is created on a first conveyor and compacted on a second conveyor, arranged at a lower height than the first conveyor, and to which the layer of ceramic powder material is fed by means of a discharge device configured to uniform the level of the layer of ceramic powder material, so that this layer reaches the compaction station with an even thickness. In detail, the discharge device generally comprises a wall and a conveyor belt which are arranged in parallel and at a defined distance from each other that defines the even thickness that the layer of ceramic powder material will assume once discharged from this discharge device.

Another system and method to manufacture ceramic articles of known type that tries to address this problem is that described in document CN111203969 which describes a high-precision decoration process for porcelain stoneware tiles.

However, even these known solutions have a number of disadvantages, including the following.

First of all, the pattern created on the layer of ceramic powder material at the first upper conveyor, while maintaining a similar course, tends to deform when it passes through the discharge device (the more uneven the thickness of the layer of ceramic powder material is before reaching the discharge device, i.e. the more different with respect to the horizontal is the level of the layer of ceramic powder material at the mouth of the discharge device). Generally, to deal with this problem use is made of vision systems which are adapted to detect the deformation of the pattern of the layer of ceramic powder material once it has been discharged from the discharge device, and of graphics correction systems to be placed on the second lower conveyor in an attempt to correct such deformations, and/or of digital printing devices adapted to create surface decorations on the layer of compacted ceramic powder material to try to reproduce the desired aesthetic appearance.

This risks, in any case, compromising the aesthetic appearance of the final ceramic article, particularly in terms of the degree of similarity with natural stones or wood.

Furthermore, the known systems and methods have limitations in terms of both the number of veins/streaks that can be manufactured, which will depend on the number of feeding devices and/or suction devices, and the type of veins/streaks, since the known methods and systems only allow manufacturing veins/streaks that maintain for their entire extension a main direction of development along the moving direction of the conveyor assembly onto which the ceramic powder material is fed.

Aim of the present invention is to provide a system to manufacture ceramic articles and a method to manufacture ceramic articles, which make it possible to overcome, at least in part, the drawbacks of the prior art.

SUMMARY

In accordance with the present invention, there is proposed a system to manufacture ceramic articles and a method to manufacture ceramic articles, in particular ceramic slabs and tiles, according to what is claimed in the appended independent claims, and preferably, in any of the claims dependent directly or indirectly on said independent claims.

Claims describe preferred embodiments of the present invention forming an integral part of the present description.

BRIEF DESCRIPTION OF THE DRAWINGS

The invention will now be described with reference to the accompanying drawings, which show some non-limiting examples of embodiments, in which.

DETAILED DESCRIPTION

Figure 1:
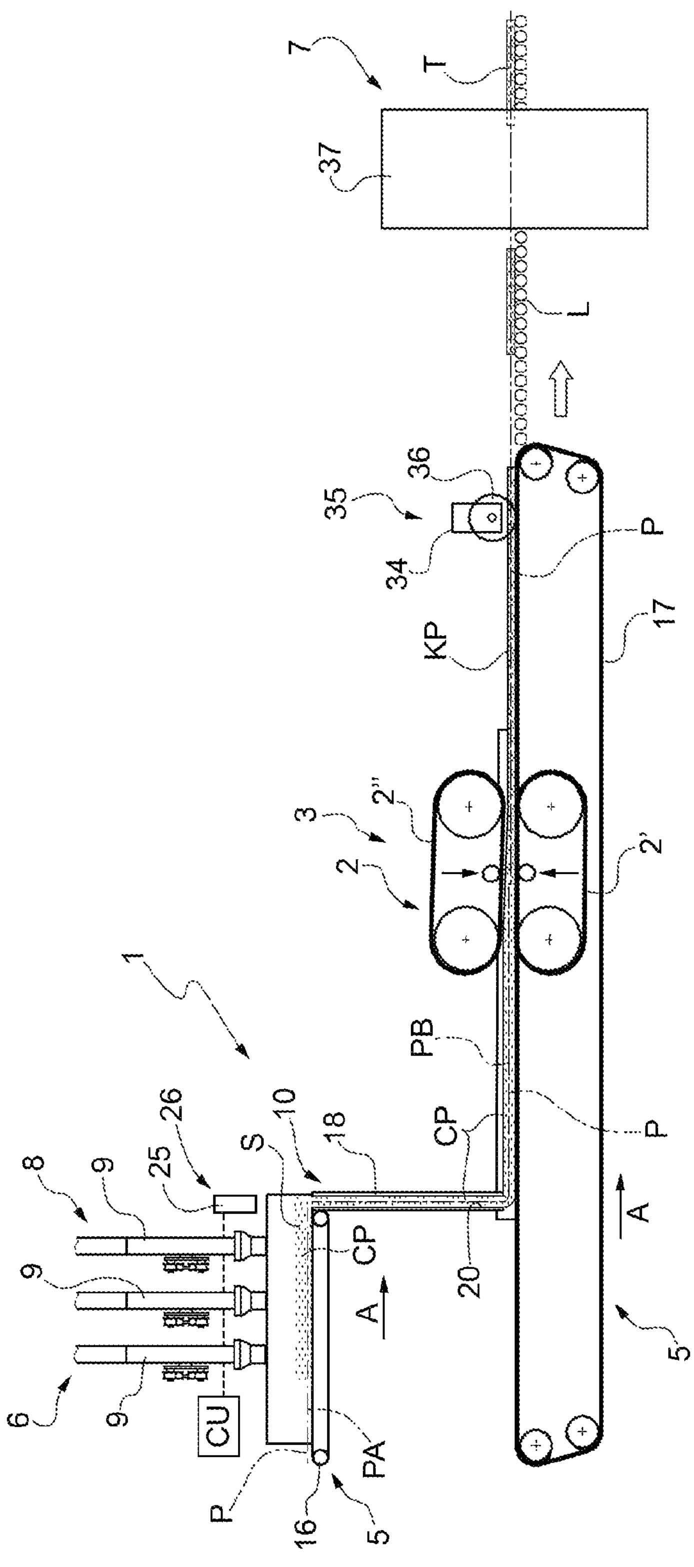
FIG. 1 represents a schematic side view of a system to manufacture ceramic articles according to the present invention.

In the accompanying figures, number 1 denotes a system to manufacture ceramic articles T. In particular, the ceramic articles T are ceramic slabs or tiles. Even more particularly, the present invention finds advantageous, but not exclusive, application in the manufacture of ceramic slabs and tiles having internal streaks or veins across the full thickness, to which the following description will make explicit reference without losing generality.

The system 1 to manufacture ceramic articles T comprises: a compaction device 2 (schematically shown in FIG. 1), which is arranged at a compaction station 3 and is configured to compact, preferably in a substantially continuous manner, a powder material CP comprising ceramic powder (in particular, the powder material CP is ceramic powder—e.g. containing clays, sands and/or feldspars), in order to obtain a layer of compacted powder KP; and a conveyor assembly 5 which is configured to transport (advantageously but not necessarily, in a substantially continuous manner) the powder material CP along a given path P (schematically represented with a dotted line in FIG. 1) from an input station 6 to the compaction station 3, and to transport the layer of compacted powder KP from the compaction station 3 to an output station 7 again along the given path P.

According to some advantageous but not limiting embodiments (such as the one schematically shown in FIG. 1), the compaction device 2 (in an advantageous but not limiting way of continuous type) comprises a first compacting belt 2' which is, at the bottom, in contact with the conveyor assembly 5 at the compaction station 3 and a second compacting belt 2", which is arranged above the conveyor assembly 5 at the compaction station 3 and cooperates with the first compacting belt 2' so as to compact the layer S of powder material CP in a substantially continuous manner by exerting a pressure transverse (in particular, normal) on the conveyor assembly 5 in order to obtain the layer of compacted powder KP.

The system 1 to manufacture ceramic articles T further comprises: a feeding assembly 8, which is configured to feed (in an advantageous but not limiting way substantially in a continuous manner) the powder material CP to the conveyor assembly 5 (in particular, above the conveyor assembly 5), at the input station 6, so as to generate a layer S of powder material CP. In particular, the conveyor assembly 5 is arranged and configured to support from below the layer S of powder material CP and the layer of compacted powder KP along the given path P.

Advantageously, the conveyor assembly 5 is configured to convey said layer S of powder material CP from the input station 6 in a moving direction A (in an advantageous but not limiting way in a substantially continuous manner).

Figure 4:
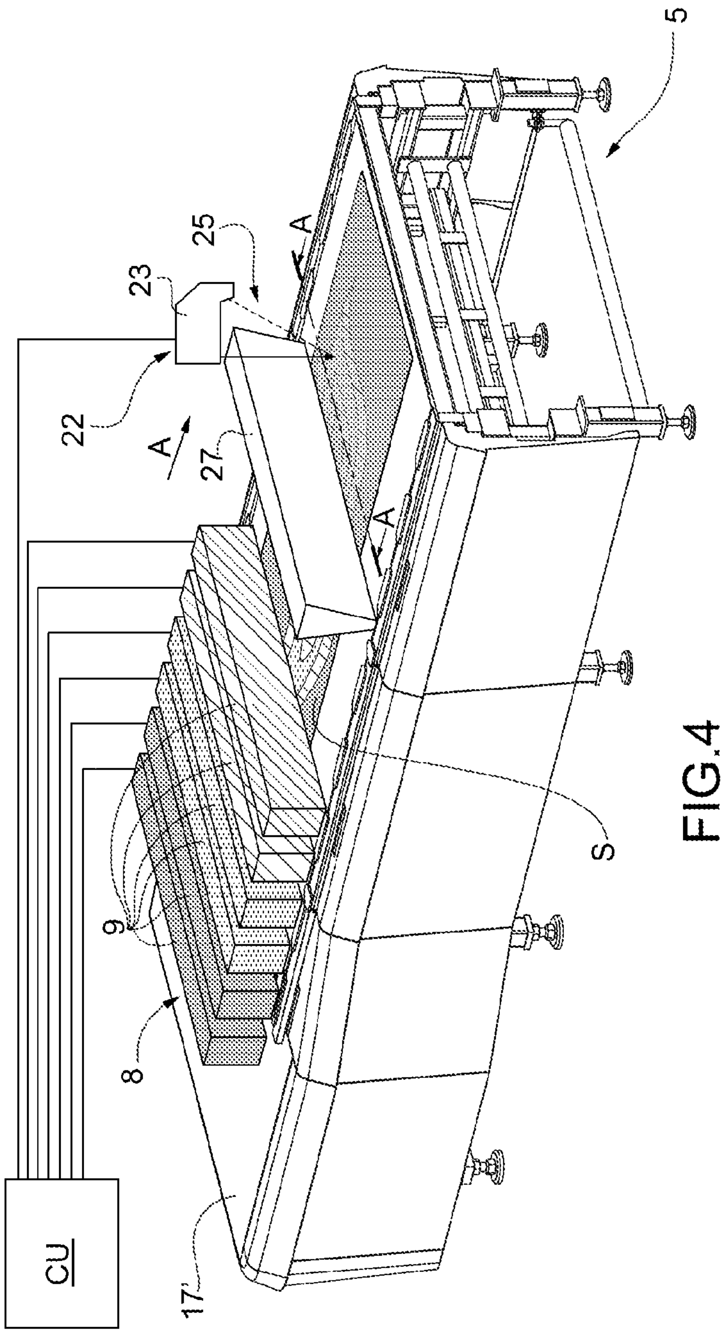
Figure 5:
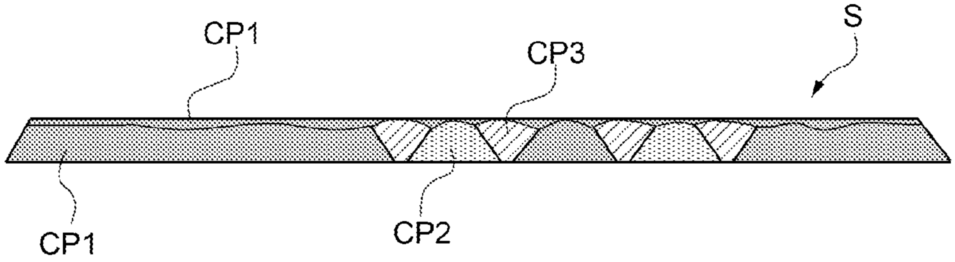
FIG. 5 shows a cross-sectional view, made along section A-A of FIGS. 2 to 4, of a layer of powder material manufactured with the system of FIGS. 2 to 4.
Figure 11:
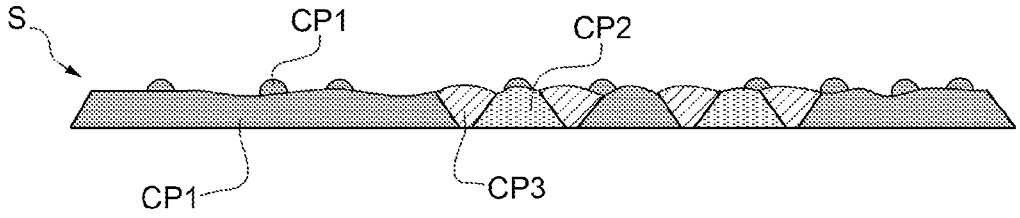
FIG. 11 shows a cross-sectional view, made along section A-A of FIGS. 9 and 10, of a layer of powder material manufactured with the system of FIGS. 9 and 10.
Figure 9:
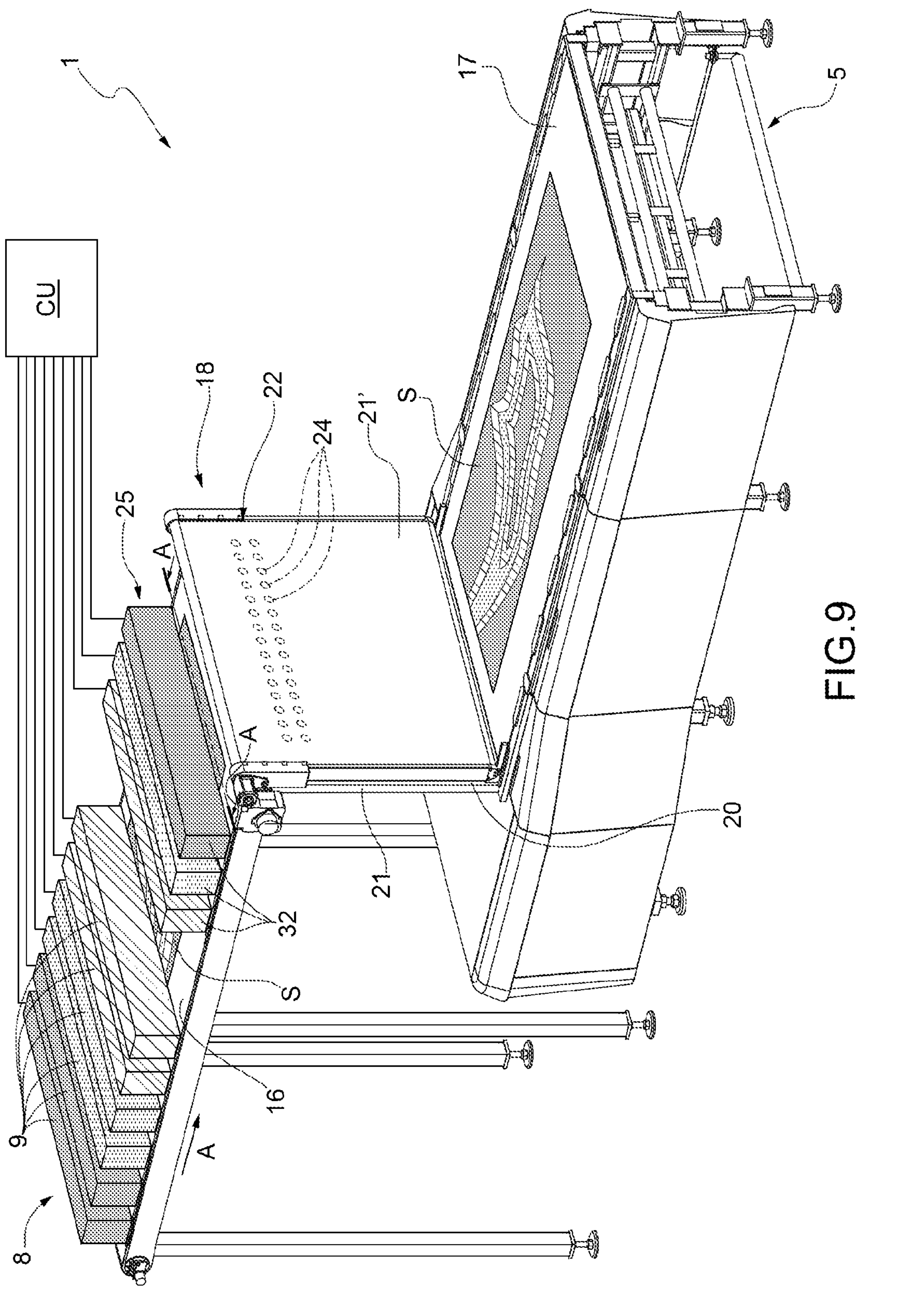

Advantageously, the feeding assembly 8 comprises a plurality of digital feeding devices 9. In particular, in the non-limiting embodiments shown in FIGS. 2, 3, 4, 6, 7, 9, 10 and 13, the feeding assembly 8 comprises six digital feeding devices 9 for feeding onto the conveyor assembly 5 different types of powder material, in particular three types of powder material indicated as CP1, CP2, CP3 in FIGS. 5, 8 and 11 or two types of powder material indicated as CP1, CP2 in FIG. 13.

In an advantageous but not in a limiting way, the different types of powder material CP1, CP2 and CP3 have different colours between them. Alternatively or additionally, the different types of powder materials CP1, CP2 and CP3 have different physical characteristics between them.

In this way it is possible to create a defined pattern on the layer S of powder material CP with chromatic effects in the thickness of the ceramic articles T.

Such chromatic effects are, for example, veins or streaks visible in the edges of the ceramic articles T. It is understood that one or more of the different types of powder materials CP1, CP2 and CP3 may coincide (i.e. be substantially the same) with each other.

Figure 13:
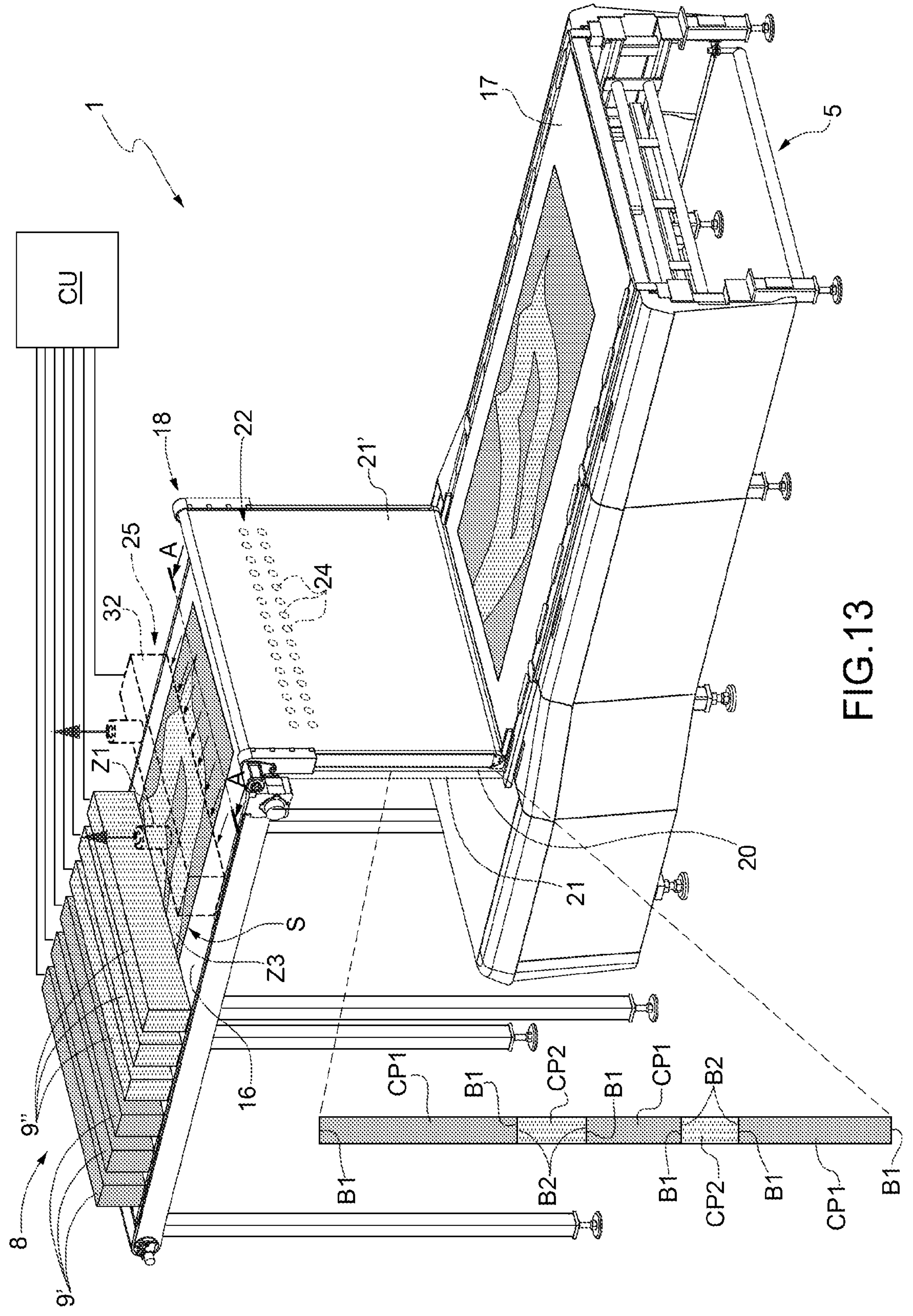
Figure 13A:
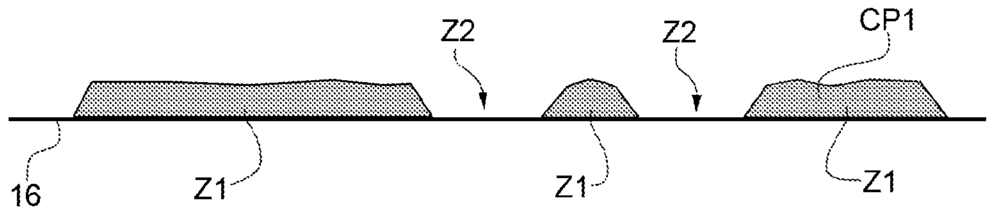
FIG. 13A schematically shows a step of the process to manufacture the layer of powder material of FIG. 13 in accordance with an embodiment of the present invention.
Figure 13B:
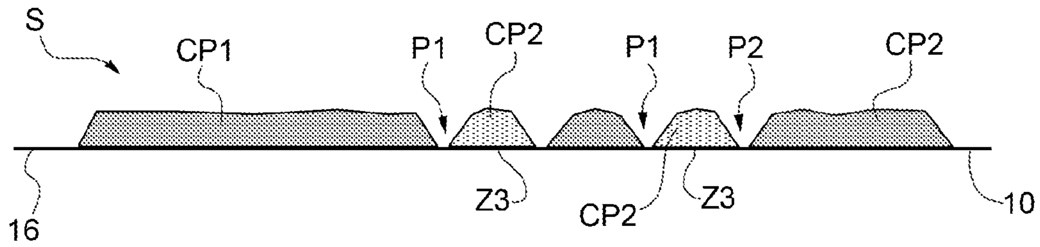
FIG. 13B schematically shows a side view, along section A-A of FIG. 13, of a layer of powder material manufactured by means of the system to manufacture ceramic article of FIG. 13.
Figure 15A:
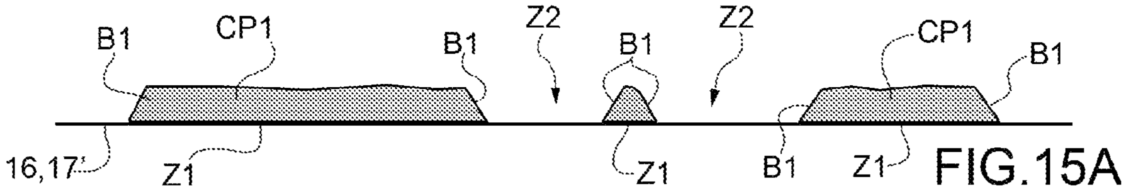
FIGS. 15A, 15B, 15C and 15D schematically show four successive steps of the process to manufacture the layer of powder material of FIG. 15 in accordance with an embodiment of the present invention
Figure 15B:
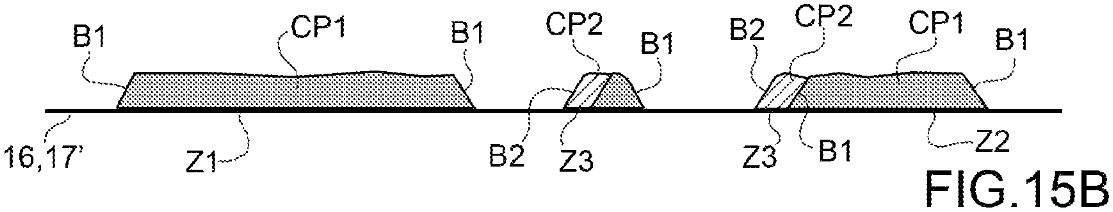

According to some advantageous but not limiting embodiments such as the one shown in FIGS. 13, 13A and 13B, the feeding assembly 8 (in particular, the plurality of digital feeding devices 9) comprises at least a first digital feeding device 9' configured to feed a first type of powder material CP1 onto the conveyor assembly 5 at a first defined area Z1 of the input station 6 such that at least a second defined area Z2 of the input station 6 remains without the first type of powder material CP1 (see, in particular, FIGS. 13A and 15A) and at least one second digital feeding device 9" configured to feed a second type of powder material CP2, which is different from the first type of powder material CP1, onto the conveyor assembly 5 at least at a third defined area Z3 of the input station 6, which is comprised in (in particular, is at least partially coincident with) the second defined area Z2 (see, for example, FIGS. 13 and 15B) so as to form a layer S of powder material (CP) reproducing a defined pattern (see, for example, the accompanying figures).

In particular, in the non-limiting embodiment of the system 1 shown in FIG. 13, the feeding assembly 8 (in particular, the plurality of digital feeding devices 9) comprises six digital feeding devices 9, a first assembly of first digital feeding devices 9' suited to feed a first type of powder material CP1 onto the conveyor assembly 5, in particular at the aforementioned first defined area Z1 of the input station 6 (see FIG. 13A), and a second assembly of second digital feeding devices 9'' suited to feed onto the conveyor assembly 5 a second type of powder material CP2 in particular at the aforementioned third defined area Z3 of the input station 6 (see FIG. 13B). Whereas, in the non-limiting embodiment of the system 1 shown in FIGS. 14 and 14A, the feeding assembly 8 (in particular, the plurality of digital feeding devices 9) comprises ten digital feeding devices 9: a first pair of first digital feeding devices 9' suited to feed a first type of powder material CP1 onto the conveyor assembly 5 at the aforementioned first defined area Z1 of the input station 6 (see FIG. 15A); a second pair of second digital feeding devices 9'' suited to feed onto the conveyor assembly 5 a second type of powder material CP2 at the aforementioned third defined area Z3 of the input station 6 (see FIG. 15B); a third pair of third digital feeding devices 9''' suited to feed onto the conveyor assembly 5 a third type of powder material CP3 at a fourth defined area Z4 of the input station 6 (see FIG. 15C), which fourth defined area Z4 is comprised in (at least partially coincident with) the second defined area Z2 and is different from the third defined area Z3; a fourth pair of fourth digital feeding devices 9IV suited to feed onto the conveyor assembly 5 a further type of powder material CP, in this non-limiting case similar to the second type of powder material CP2, at a fifth defined area Z5 of the input station 6 (see FIG. 15D), which fifth defined area Z5 is comprised in (at least partially coincident with) the second defined area Z2 and is different with respect to the third defined area Z3; and a fifth pair of fifth digital feeding devices 9V suited to feed onto the conveyor assembly 5 a further type of powder material CP, in this non-limiting case similar to the first type of powder material CP1, on the remaining part of the second defined area Z2, i.e. at the parts left without powder material by the remaining digital feeding devices 9 (see FIG. 15).

In an advantageous but not limiting way, the first defined area Z1 has an extension greater than the second defined area Z2, and thus the third defined area Z3 and any other defined areas Z4, Z5. Even more particularly (in an advantageous but not limiting way), the first defined area Z1 defines (forms) at least half of the extension of the layer S of powder material CP that is formed on the conveyor assembly 5 at the input station 6 and, in an advantageous but not limiting way, the third defined area Z3 and/or any other defined areas Z4, Z5 defines/define veins/streaks that develop with various courses within the layer S of powder material CP.

Figure 12:
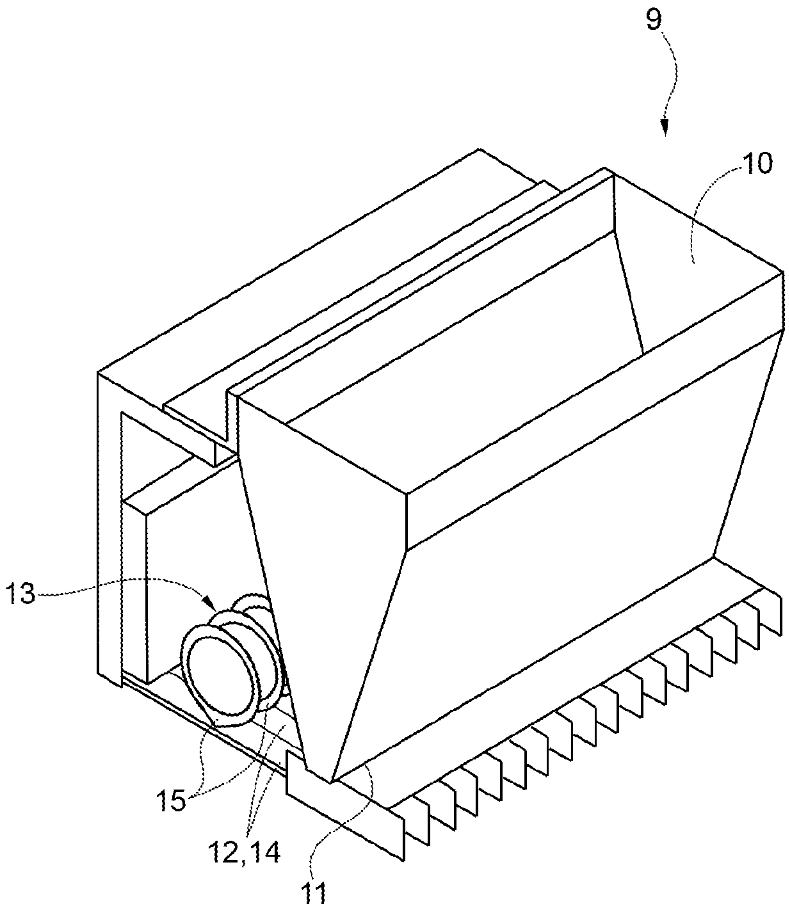
FIG. 12 shows a schematic and perspective view of a feeding device of the system of FIGS. 2, 3, 4, 6, 7, 9 and 10.

According to some preferred but not limiting embodiments (such as the ones shown, see in particular FIG. 12) each feeding device 9, 9', 9'' comprises at least one respective container 10, which is configured to contain a respective type of powder material CP (for example in the case shown in the accompanying Figures CP1 or CP2 or CP3) and has a respective output mouth 11, whose longitudinal extension is transverse (in particular, perpendicular) to the moving direction A, a plurality of distribution elements 12, which are arranged in succession along the respective output mouth 11 and a plurality of actuators 13, each configured to move a respective distribution element 12 between a first position and a second position, in which the respective type of powder material CP is allowed to pass (in particular, come out) through the area of the output mouth 11 where the respective distribution element 12 is arranged.

In detail, in an advantageous but not limiting way, in the second position an opening is defined (in particular, by the distribution element 12 and by the conveyor assembly 5) through which the respective type of powder material CP is allowed to pass (in particular, come out). Alternatively or in combination (in an advantageous but not limiting way), a further opening is also defined in the first position (in particular, by the distribution element 12 and by the conveyor assembly 5).

Advantageously, this further opening has a smaller extension than the aforementioned opening defined in the second position.

According to some advantageous but not limiting embodiments, each of the distribution elements 12 comprises (in particular, is formed by) a blade 14, which (advantageously, at least in the aforementioned first position) is arranged so as to allow the respective type of powder material CP to accumulate on it; and in an advantageous but not limiting way, each of the actuators 13 has at least one vibrating element 15 (preferably a plurality of vibrating elements 15) which can be caused to vibrate so as to provoke the vibration of the respective distributing element 12, in particular, of the blade 14, at least between the first position and the aforementioned second position so as to induce the accumulated powder material CP (in particular, of the quantity of the respective type of powder material CP accumulated) on the blade 14 itself to come out.

In an advantageous but not limiting way, at least in the first position, the blade 14 is inclined with respect to the horizontal by an angle approximately equal to the angle of accumulation of the type of powder material CP (for example in the case shown in the accompanying Figures CP1 or CP2 or CP3) that the relative container 10 is suited to contain. Still in particular, in an advantageous but not limiting way, each of the actuators 13 comprises piezoelectric material.

Furthermore, according to some non-limiting embodiments, the output mouth 11 has a plurality of (different) passage areas arranged in succession along the longitudinal extension of the output mouth 11 itself.

According to some non-limiting embodiments (such as the ones shown in the accompanying figures), the feeding assembly 8 is as described in patent application WO2009118611 (of the same applicant) and/or patent IT1314623.

Advantageously, but not necessarily, the system 1 to manufacture ceramic articles T (in particular, the feeding assembly 8) comprises a computerised control unit CU configured to drive the actuators 13 of the various digital feeding devices 9, 9', 9'', 9''', 9IV, and 9V so as to (selectively) adjust the feeding of the powder material CP. Advantageously, this makes it possible to control the feeding assembly 8 (in particular, each digital feeding device 9) so as to feed at least a first type of powder material CP1 onto a first area of the conveyor assembly 5, at the input station 6, and at least a second type of powder material CP2, which is different from the first type of powder material CP1, onto a second area of the conveyor assembly 5, at said input station 6, which is at least partially different from the first area, so as to create a layer S of powder material CP having a defined pattern (as represented in FIGS. 2, 3, 4, 5, 6, 7, 8, 9, 10, 11, 13, 14, and 14A, as explained above in which three different types of powder material CP1, CP2, and CP3 are fed onto respective areas so as to define the pattern on the layer S of powder material CP). In addition, the possibility of selectively operating each of the actuators 13 of the various digital feeding devices 9 allows, for example by suitably varying the sequence, intensity and frequency of vibration of the various vibrating elements 15 to obtain a controlled delivery of the powder material CP.

In detail, according to some advantageous but not limiting embodiments (such as the one shown in FIGS. 14, 14A, 15, 15A-15D), the computerised control unit CU is configured to control the feeding assembly 8 (in particular, at least the second digital feeding device 9" in order to feed the second type of powder material CP2) such that the third defined area Z3 is side-by-side in contact with the first defined area Z1 along at least one lateral edge B1 of the first defined area Z1. Advantageously, said lateral edge B1 extends parallel to the moving direction A and the third defined area Z3 extends parallel to the lateral edge B1 in a direction B transverse to the moving direction A. In other words, after the first type of powder material CP1 has been fed onto the conveyor assembly 5, assuming (in the direction B) a trapezoidal conformation with the lateral edges B1 inclined (in particular, by a variable angle depending on the angle of internal friction of the type of powder material CP1) and defining the aforementioned first defined area Z1, the second type of powder material CP2 is fed in contact with at least one of said lateral edges B1 of the first defined area Z1 (for example, in the accompanying figure with two edges B1 of the first defined area Z1) and follows the course, i.e. the inclination, of the lateral edge B1 on which it rests.

The same applies, advantageously, to the further types of powder material CP2, CP3 which are fed side-by-side and in contact with the further edges B2, B3, B4 of the further defined areas Z3, Z4 and Z5 (see FIGS. 5A to 5D). Advantageously, this makes it possible to obtain streaks/veins in the layer S of powder material CP (and thus in the final ceramic articles T) whose aesthetic appearance more faithfully reproduces the typical stratifications of natural stones or wood.

Figure 2:
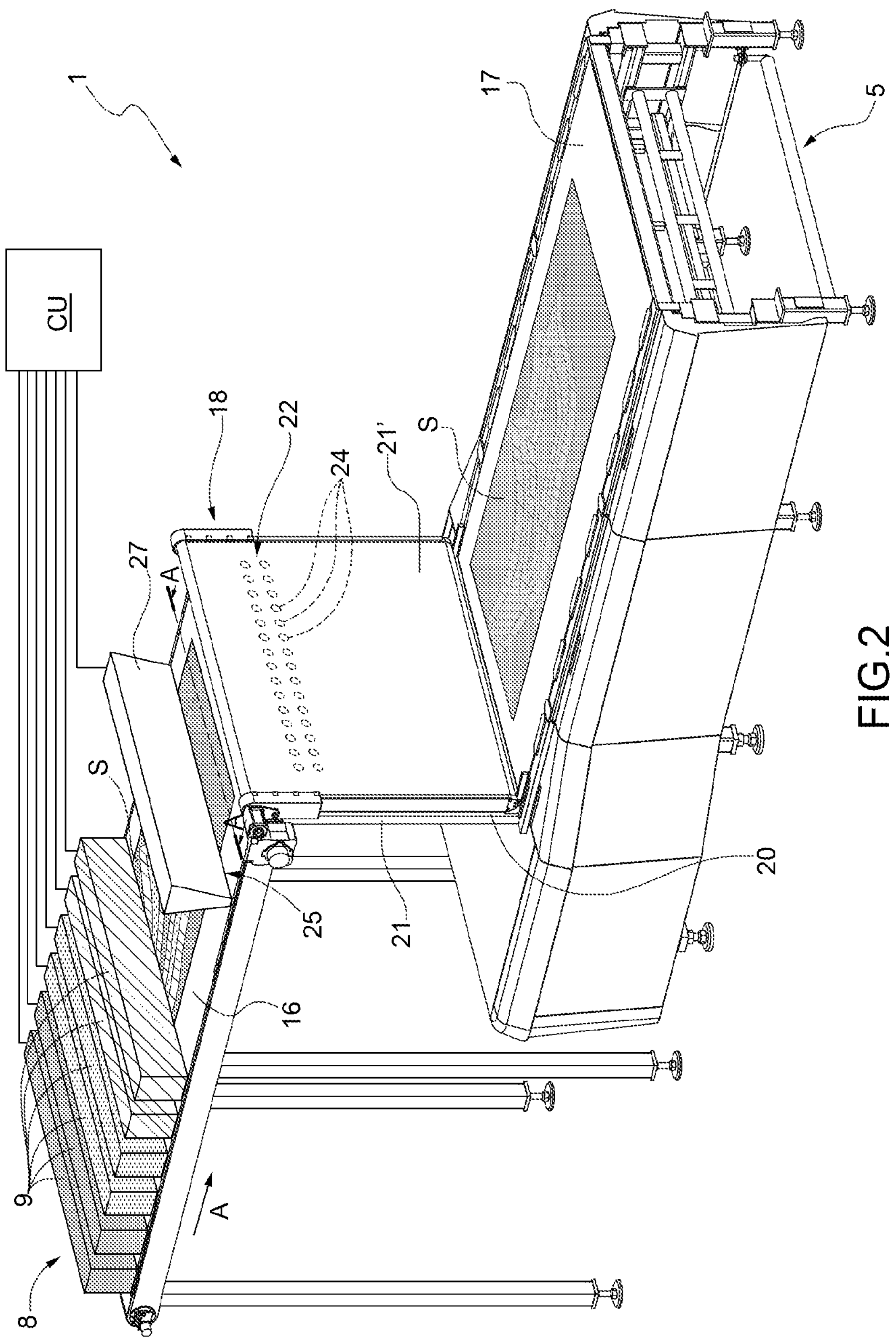
FIGS. 2, 3, 4, 6, 7, 9, 10, 13, 14, and 14A show schematic and perspective views of part of the system to manufacture ceramic articles, schematically represented in FIG. 1, in accordance with various embodiments of the present invention.
Figure 3:
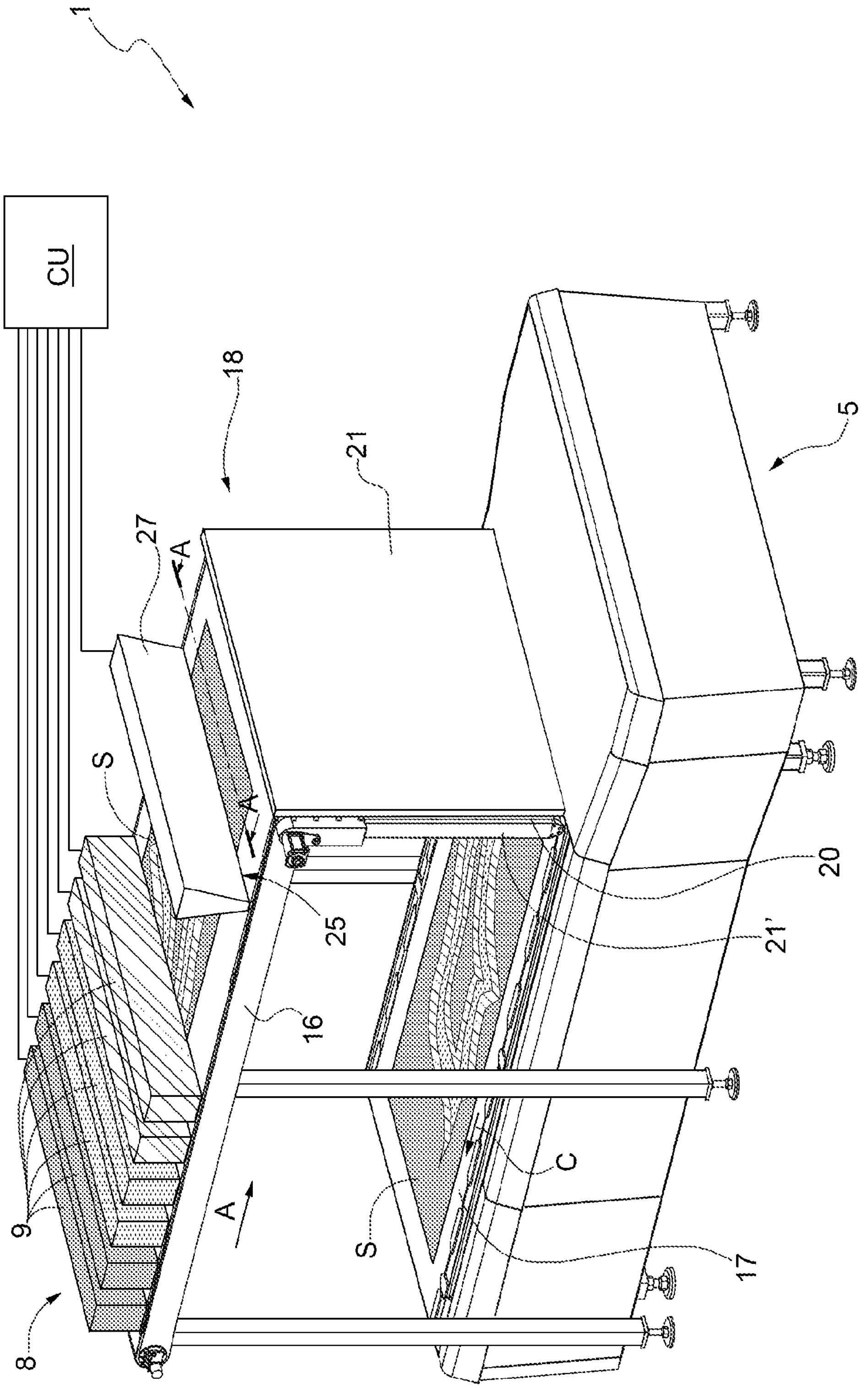

According to alternative advantageous but not limiting embodiments (such as the one shown in FIGS. 2, 3 and 3A), the computerised control unit CU is configured to control the feeding assembly 8 (in particular, at least the second digital feeding device 9" in order to feed the second type of powder material CP2) such that the third defined area Z3 is adjacent to the first defined area Z1 and is conformed such that at least a portion P1 of the second defined area Z2 remains without (also) the second type of powder material CP2 (see FIG. 3). In particular, in an advantageous but not limiting way, this part P1 of the second defined area Z2 is interposed between the first area Z1 and the third area Z3 (or if there are other areas, between the first defined area Z1 and the closer area that is adjacent thereto).

According to some advantageous but not exclusive embodiments such as the ones shown in FIGS. 1, 2, 3, 6 9, 13, and 14 the conveyor assembly 5 comprises, in turn: an upper conveyor device 16, for example a conveyor belt (as shown in FIGS. 1, 2, 3, 6, 9, 13, and 14) extending along a segment PA of the given path P, in particular from the input station 6 to a discharge station 10; a lower conveyor device 17, which is arranged at a lower height than the upper conveyor device 16 and extends along a second segment PB of the given path P downstream of the segment PA (see in particular, FIG. 1), in particular from a discharge station 10 at least to the compaction station 3; and a discharge assembly 18 arranged at the discharge station 10, immediately downstream of the upper conveyor device 16 and immediately upstream of the lower conveyor device 17, along the given path P comprising a substantially vertical discharge channel 20 which is configured to receive the layer S of powder material CP from the upper conveyor device 16 and to discharge it onto the lower conveyor device 17.

Even in more detail, according to some advantageous but not limiting embodiments (such as the ones shown in FIGS. 13 and 14) in this case the discharge assembly 18 (more particularly, the discharge channel 20) is arranged and configured to provoke the first type of powder material CP1 and/or said second type of powder material CP2 to occupy the aforementioned at least one part P1 of the second defined area Z2 so as to obtain as output of the discharge assembly 18 a layer S of powder material CP that is substantially continuous and having a defined height reproducing a defined pattern (see for example FIG. 13).

This makes it possible, advantageously, to obtain streaks/veins in the layer S of powder material CP (and therefore in the final ceramic articles T) whose aesthetic appearance is not influenced by the classic trapezoidal shape that the powder material CP assumes (along the direction B) once deposited. In fact, it was surprisingly observed that by passing through the discharge channel 20 the first type of powder material CP1 and the second type of powder material CP2 that constituted, respectively, the first and third defined area Z1 and Z3 are redistributed (by gravity) occupying the aforementioned part P1 that had been left without powder material by straightening the edges B1, B2 of said defined areas Z1 and Z3 (as schematically represented in FIG. 13, wherein a schematic and enlarged scale representation of the layer S of ceramic powder CP in the discharge channel 20 is shown after the first type of powder material CP1 and the second type of powder material CP2 have redistributed), with considerable aesthetic advantages for the final ceramic articles T.

According to some advantageous but not limiting embodiments such as the one shown in FIGS. 1-3, 6, 9, 13, and 14 the discharge channel 20 comprises (in particular, is defined by) a substantially vertical wall 21 extending perpendicularly to the moving direction A below the upper conveyor device 16 and above the lower conveyor device 17 and a conveyor belt 21' parallel to and facing the substantially vertical wall 21 and at a given distance from said wall 21. In particular, said discharge assembly 18 is configured to level (further, if necessary) the layer S of powder material CP before discharging it onto the lower conveyor device 17. Even more particularly, the given distance at which the wall 21 and the conveyor belt 21' are placed and the distance between a lower edge of said conveyor belt 21' and the lower conveyor device 17 are related to the (in particular, define the) thickness of the layer S of powder material CP that is discharged onto the lower conveyor device 17.

According to other advantageous but not limiting embodiments not shown, the discharge channel 20 comprises (in particular, is defined by) two substantially vertical walls (such as the above-described wall 21) facing each other and at a given distance from each other. In other words, in this case the discharge channel 20 comprises (in particular, is defined by) a further wall, in place of the conveyor belt 21', which is also (as said for the conveyor belt 21') parallel to and facing the substantially vertical wall 21 and at a given distance from said wall 21.

It is understood that according to still other advantageous but not limiting embodiments not shown, the discharge channel 20 comprises (in particular, is defined by) a further conveyor belt in place of the substantially vertical wall 21 which extends perpendicularly to the moving direction A below the upper conveyor device 16 and above the lower conveyor device 17 and is facing the conveyor belt 21' at a given distance from said conveyor belt 21'. According to still other advantageous but not limiting embodiments, the substantially vertical wall 21 (or the further conveyor belt) is inclined by an angle varying between about 0° and about 30° with respect to the vertical, so as to reduce the friction exerted on the powder material CP during the passage through the discharge channel 20 so as to limit the risk of smearing and/or deformation in the pattern created on the layer S of powder material CP.

In this case (i.e. when the conveyor assembly 5 is provided with an upper conveyor device 16 and with a lower conveyor device 17—like in the embodiments shown in FIGS. 2, 3, 6, 9, 13, and 14), in an advantageous but not limiting way, the input station 6 lies along the first segment PA of the given path P while the compaction station 3 lies along the second segment PB of said given path P.

According to other non-limiting embodiments (such as the ones shown in FIGS. 4, 7, 10 and 14), the conveyor assembly 5 comprises a single conveyor device 17', for example comprising a conveyor belt, which extends along the given path P in a single moving direction A (in particular, in a single moving direction) from the input station 6 to the output station 7.

In an advantageous but not limiting way, the system 1 to manufacture ceramic articles T further comprises a detection unit 22 which is arranged upstream of the compaction device 2 along the given path P and is configured to detect the height (namely, the thickness or the level) of the powder material CP in the conveyor assembly 5. In detail, the detection unit 22 is configured to detect the height of the layer S of powder material CP after it has been created on the conveyor assembly 5 (in particular, on the upper conveyor device 16, when the conveyor assembly 5 is provided with an upper conveyor device 16 and with a lower conveyor device 17—like in the embodiments shown, for example, in FIGS. 2, 3, 6 and 9, or on the single conveyor device 17', when the conveyor assembly 5 consists of a single conveyor device 17', like in the embodiments shown in FIGS. 4, 7, 10 and 14A).

Even in more detail, according to some advantageous but not exclusive embodiments (such as the ones shown in FIGS. 4, 7, 10 and 14A), the detection unit 22 comprises (in particular, consists of) a profilometer 23 arranged on the conveyor assembly 5 to detect the height (namely, the thickness) of the layer S of powder material CP.

In an advantageous but not limiting way (as schematically shown in FIGS. 4, 7, 10, 14A), the profilometer 23 is of a known type and comprises an emission device for emitting a laser beam onto the layer S of powder material CP and a viewing unit, for example a camera, arranged to view the reflected radiation of the laser beam onto the layer S of powder material CP and assess, based on this information, the thickness of the layer S of powder material CP.

Alternatively or additionally, in particular in advantageous but not exclusive embodiments in which the conveyor assembly 5 is provided with an upper conveyor device 16 and with a lower conveyor device 17 (such as the ones shown in FIGS. 1, 2, 3, 6, 9, 13, and 14), the detection unit 22 comprises (in particular, consists of) a plurality of sensors 24 each configured to detect the height (in particular, the level) of the layer S of powder material CP inside the discharge assembly 18. Even in more detail, in an advantageous but not limiting way, in this case each of the sensors 24 (schematically represented with circles in FIGS. 2, 3, 6 and 9) is fixed to the wall 21 and is configured to detect the level of the powder material CP as it is discharged through the discharge channel 20.

In an advantageous but not limiting way according to some embodiments (such as the ones shown in FIGS. 1, 2, 3, 6, 9, 13, and 14), the detection unit 22 comprises (in particular, consists of) a plurality of capacitive analogue sensors 24, each configured to detect the height (in particular, the level) of the layer S of powder material CP inside the discharge assembly 18.

According to some advantageous but not limiting embodiments (such as, for example, those shown in FIGS. 1, 2, 3, 4, 6, 7, 9, 10, 13, 14 and 14A), the system 1 to manufacture ceramic articles T further comprises a height correction unit 25 which is arranged at a correction station 26, upstream of the detection unit 22 and of the compaction device 2 (in particular, of said compaction station 2) along said given path P, and can be operated so as to change the height of the layer S of powder material CP crosswise to the moving direction A. depending on the data detected by the detection unit 22, in order to make the height of the layer S of powder material CP more constant crosswise to said moving direction A.

Advantageously, the aim of the height correction unit 25 is to make the height (namely, the thickness or the level) of the layer S of powder material CP, in particular along the direction B, before the compaction station 3, as uniform as possible (i.e. make it as constant as possible). Furthermore, when the conveyor assembly 5 is provided with an upper conveyor device 16 and with a lower conveyor device 17—such as the ones shown in FIGS. 1, 2, 3, 6, 9, 14 and 15 in an advantageous but not limiting way, the correction unit 25 is configured to ensure that the level of said layer S of powder material CP entering inside the discharge assembly 18 (in particular, of the discharge channel 20) is substantially horizontal. This makes it possible to limit as much as possible the levelling action carried out by the discharge assembly 18 and consequently to limit as much as possible the deformations which would arise on the pattern created on the layer S of powder material CP by the feeding assembly 8 as a result of the levelling action of the discharge assembly 18. Precisely for this reason in this case (i.e. when the conveyor assembly 5 is provided with an upper conveyor device 16 and with a lower conveyor device 17—like in the embodiments shown in FIGS. 2, 3, 6 and 9), advantageously, the correction station 26 lies along the first segment PA of the given path P.

In an advantageous but not limiting way, the height correction unit 25 comprises a control device that is connected to the detection unit 22 and is configured to operate the height correction unit 25 depending on the data detected by the detection unit 22, as will be more clearly explained below.

In an advantageous but not limiting way, the control device of the correction unit 25 is configured to control the correction unit 25 so that it exerts a variable (differentiated) height correction action along a direction B transverse to the moving direction A.

According to some advantageous but not limiting embodiments (such as those described), the control device coincides with the computerised control unit CU described above.

According to some advantageous but not limiting embodiments (such as the ones shown in FIGS. 2 to 5), the height correction unit 25 comprises (in particular, consists of) a levelling device 27 which is arranged above the conveyor assembly 5 at the correction station 26, extends along the direction B transverse (in particular, perpendicular) to said moving direction A, and is configured to feed (in a substantially continuous manner) a quantity of a further type of powder material CP (which may be equal to or different from the types of powder material CP1, CP2 and CP3 fed of the feeding assembly 8), onto the layer S of powder material CP formed by the feeding assembly 8. In detail, the levelling device 27 is configured to vary the quantity of the further type of powder material CP fed onto the layer S of powder material CP along the direction B depending on the data detected by the detection unit 22, so as to make the height (namely, the thickness) of the layer S of powder material CP along the direction B as uniform as possible (i.e. make it as constant as possible) (see in particular FIG. 5).

More particularly, the control device of the correction unit 25 is configured to control the levelling device 27 (in particular, the various operating devices 31 described below) so as to increase the height (namely, the thickness or the level) of the layer S of ceramic powder CP in areas in which the detection unit 22 has detected a height lower than a (desired) reference height, or in any case lower than the height of the other areas.

Figure 4A:
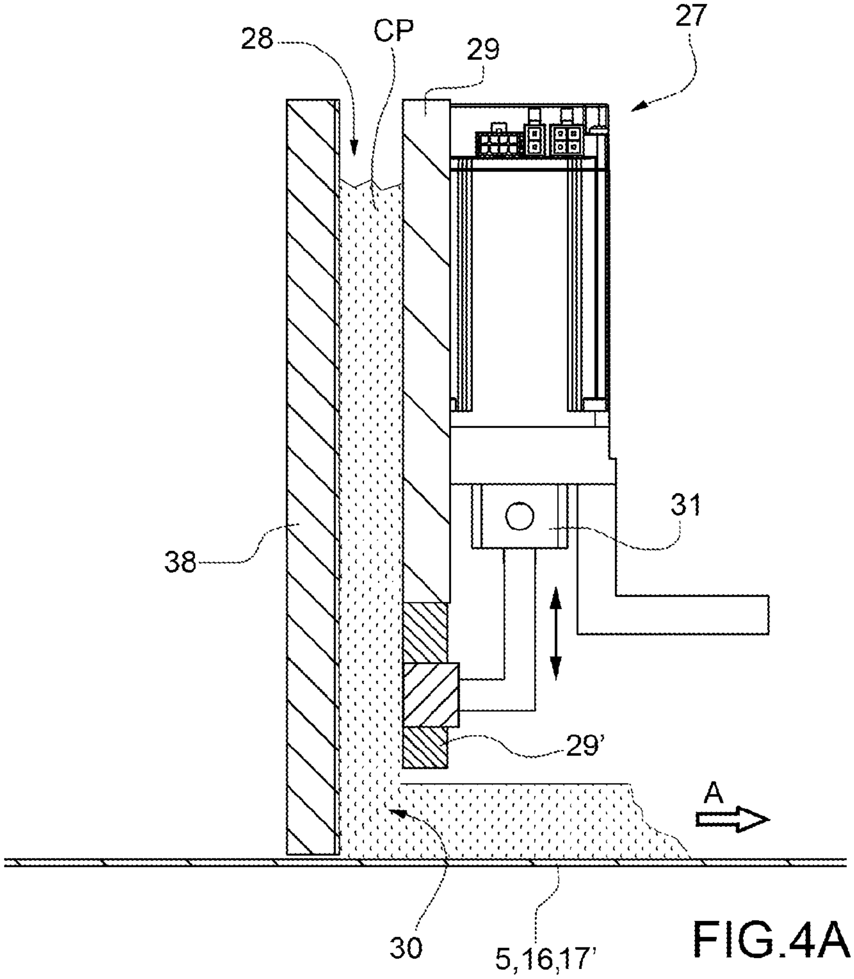
FIG. 4*a* shows a schematic and cross-sectional view of a possible levelling device of the system to manufacture ceramic articles from FIGS. 2 to 4.
Figure 4B:
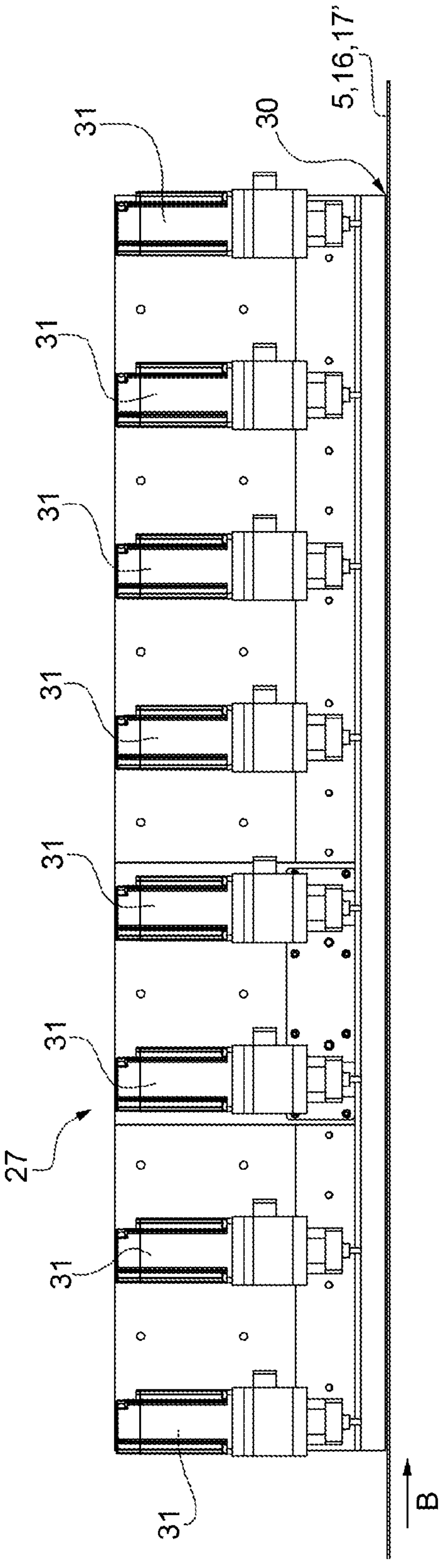
FIG. 4*b* shows a schematic side view of the levelling device of FIG. 4*a;*
Figure 6:
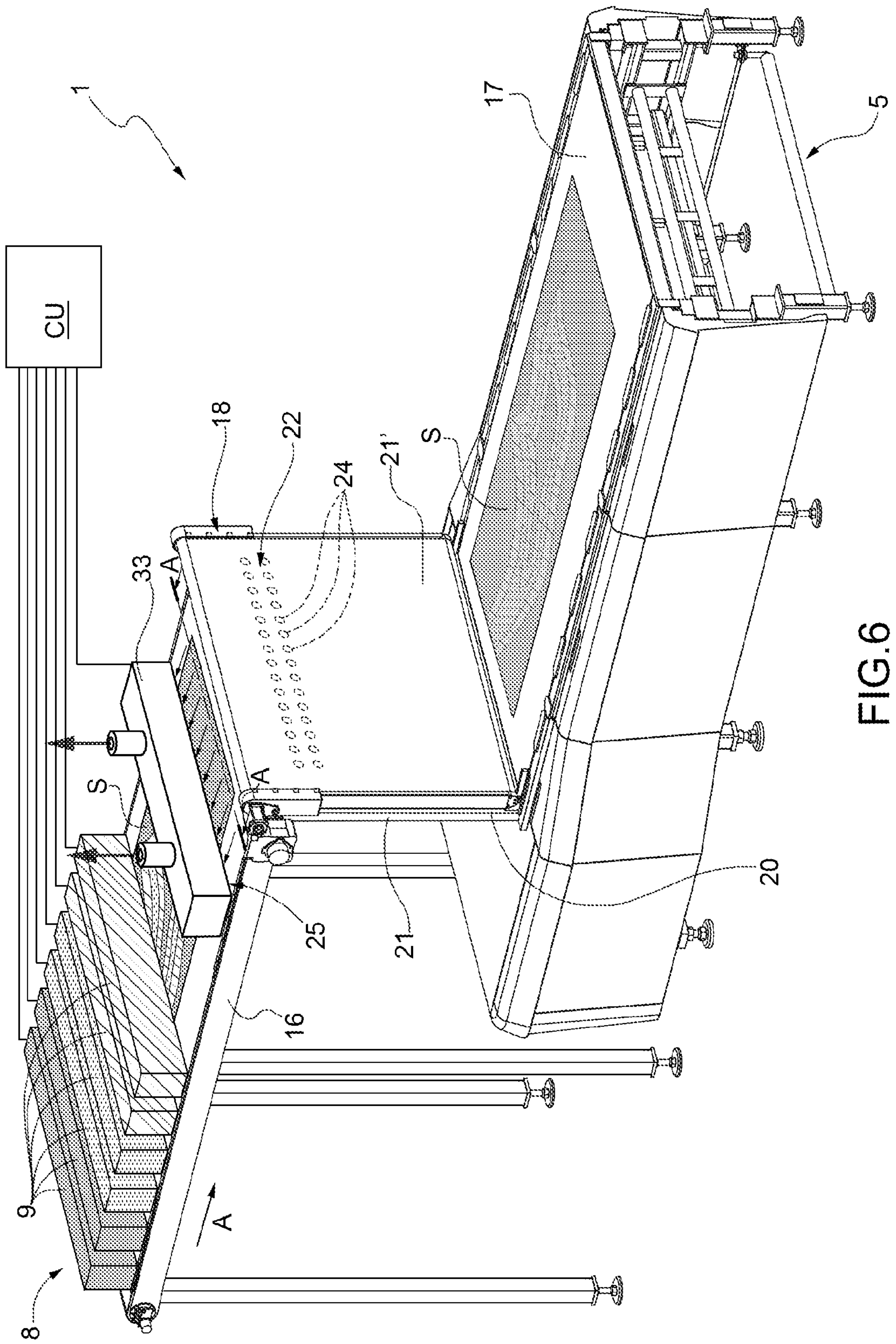

With particular reference to FIGS. 4A and 4B, in an advantageous but not limiting way, the levelling device 27 comprises, in turn: a feeding channel 28 which is configured to contain the further type of powder material CP, at least one bulkhead 29 which develops along the direction B, at an open end of the feeding channel 28, and is arranged above the conveyor assembly 5 so as to delimit at least one passage 30 between the bulkhead 29 and the conveyor assembly 5, and an operating device 31 which is configured to change the height of said passage 30 (namely, the distance between the bulkhead 29 and the conveyor assembly 5) so as to allow the further type of powder material CP to come out or prevent it from doing so and/or to change the quantity thereof. In detail, in an advantageous but not limiting way, the bulkhead 29 comprises at least one deformable part 29', e.g. made of elastically deformable material (typically an elastomer, such as rubber) and the operating device 31 is arranged and configured to deform said deformable part 29' of the bulkhead 29 to change the height of the passage 30. The operating device 31 may, for example, comprise (be) an electronically controlled hydraulic actuator and/or a brushless (more specifically, stepper) electric motor.

Furthermore, according to some advantageous but not exclusive embodiments of the invention such as the one schematically shown in FIG. 4B, the levelling device 27 comprises a plurality of operating devices 31 side-by-side along the direction B and which can be operated (configured to be operated) independently of each other, so as to change the height of the passage 30 in a mutually differentiated manner along the direction B.

Figure 7:
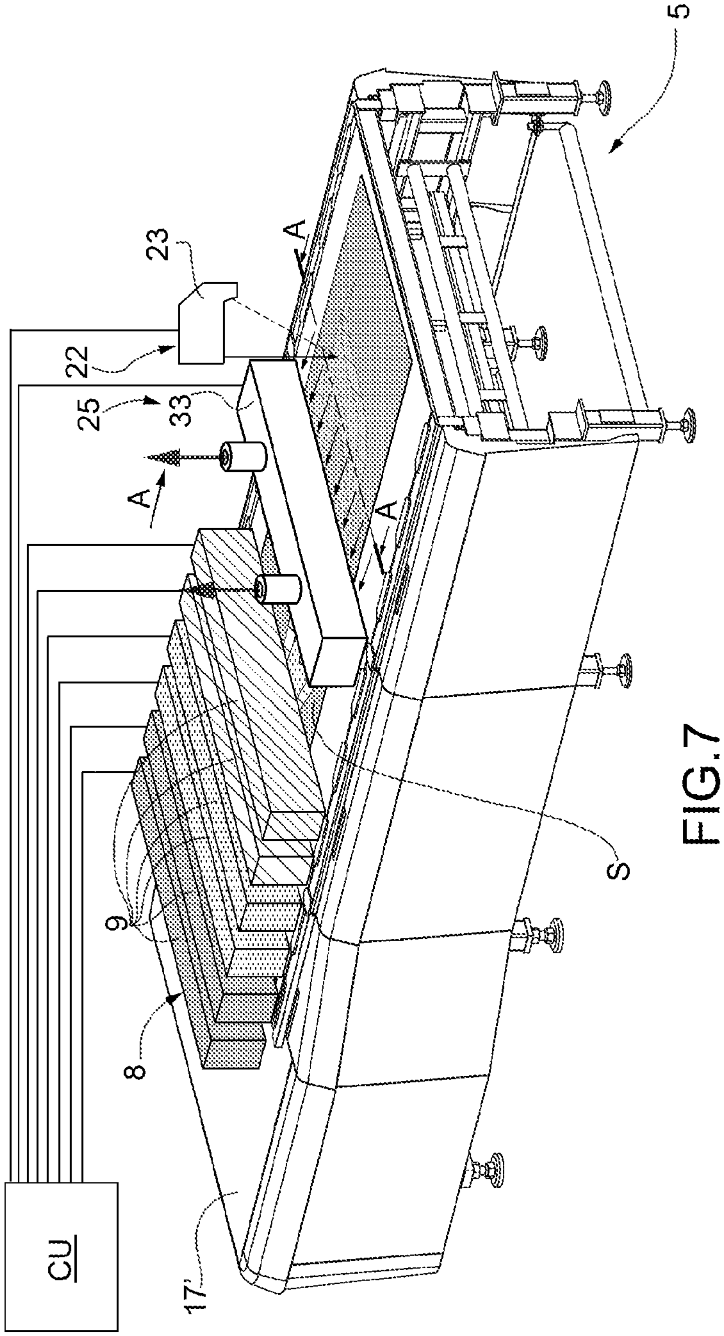
Figure 10:
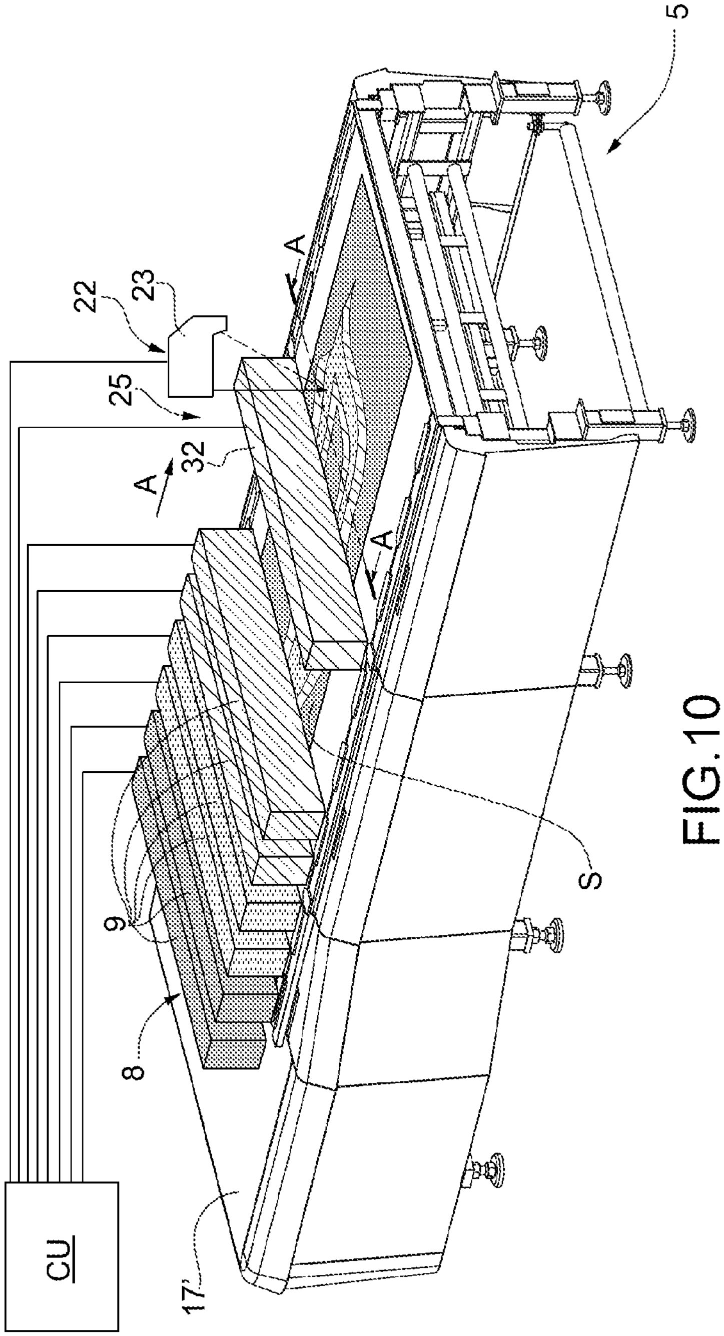

According to other embodiments not shown, the operating devices 31 are arranged on the opposite side of the conveyor assembly 5 (in particular, of the upper conveyor device 16, when the conveyor assembly 5 is provided with an upper conveyor device 16 and with a lower conveyor device 17—like in the embodiments shown in FIGS. 2, 3, 6 and 9, or of the single conveyor device 17', when the conveyor assembly 5 consists of a single conveyor device 17', like in the embodiments shown in FIGS. 4, 7 and 10) with respect to the bulkhead 29, at the correction station 26, and are configured to deform the conveyor assembly 5 (in particular, as mentioned above, the upper conveyor device 16 or the single conveyor device 17') to modify (increase or decrease) the height of the passage 30 in a mutually differentiated manner along the direction B.

Furthermore, in some cases (such as the one shown in FIG. 4A) in an advantageous but not limiting way, the levelling device 27 comprises one or more rear walls 38, which (together with the bulkhead 29) delimit (at least a segment of) the feeding channel 30.

According to specific embodiments (such as the ones shown in FIGS. 4A and 4B, the levelling device 27 comprises (is) an apparatus as described in patent application having publication number EP2050549A2 (of the same applicant as the present patent application).

In this case, according to some advantageous but not limiting embodiments (such as the one shown in FIG. 3), when the conveyor assembly 5 is provided with an upper conveyor device 16 and with a lower conveyor device 17, the upper conveyor device 16 is configured to convey the layer S of powder material CP along the first segment PA in the moving direction A (with a first moving direction), while the lower conveyor device 17 is configured to convey the layer S of powder material CP along the second segment PB in a direction C opposite (with a second direction opposite to the first direction) to the moving direction A. Such an alternative is particularly advantageous when the correction unit 25 is formed by a levelling device 27 such as the one described above, in fact in this case such a configuration of the conveyor assembly 5 ensures that the face of the layer S of powder material CP on which, at the correction station 26, the further type of powder material CP has been distributed (as explained above), at least partially covering the pattern of the layer S of powder material CP, which should be overturned before firing, is turned downwards on the lower conveyor device 17 (i.e. in contact with the lower conveyor device 17 and therefore not visible) while the face which was in contact with the upper conveyor device 16, at the correction station 26, is turned upwards (therefore visible). This allows improving the aesthetic appearance of the final ceramic articles T without the need to provide for an overturning device to overturn the layer of compacted powder KP before firing.

According to alternative embodiments, such as the ones shown in FIGS. 9, 10, 14 and 14A, the height correction unit 25 is configured to feed a further type of the powder material CP (which may be the same as or different from the types of powder material CP1, CP2 and CP3 fed of the feeding assembly 8) to the conveyor assembly 5 and comprises (in particular, consists of) at least one digital correction device 32. In detail, in the non-limiting embodiments shown in FIGS. 9, 14 and 14A the correction unit 25 comprises three digital correction devices 32, while in the embodiment shown in FIG. 10 it comprises only one digital correction device 32.

In an advantageous but not limiting way, the digital correction device 32 is analogous to the digital feeding devices 9 described above (and schematically shown in FIG. 12). In other words, in an advantageous but not limiting way, also the digital correction device 32 comprises, in turn, a further container 10 to contain the further type of powder material CP and has a further output mouth 11, whose longitudinal extension extends along the further direction B transverse (in particular, perpendicular) to the moving direction A, a plurality of further distribution elements 12 arranged in succession along said output mouth 11 and a plurality of further actuators 13, each configured to move, depending on the data detected by said detection unit 22, a respective further distribution element 12 between a first position, and a second opening position, in which the further type of powder material CP is allowed to pass (in particular, come out) through the area of the further output mouth 11 where the respective further distribution element 12 is arranged. In detail, in an advantageous but not limiting way, in the second position an opening is defined (in particular, by the distribution element 12 and by the conveyor assembly 5) through which the further type of powder material CP is allowed to pass. Alternatively or in combination (in an advantageous but not limiting way), a further opening is also defined in the first position (in particular, by the distribution element 12 and by the conveyor assembly 5) through which the further type of powder material CP is allowed to pass. Advantageously, this further opening has a smaller extension than the aforementioned opening defined in the second position.

In an advantageous but not limiting way, each of the further distribution elements 12 of the digital correction device 32 comprises (in particular, is formed by) a blade 14, which (advantageously at least in the first position) is arranged so as to allow the powder material CP to accumulate on it; and each of the further actuators 13 of the digital correction device 32 has at least one vibrating element 15 (as described above) which can be caused to vibrate so as to provoke the vibration of the respective distribution element 12 (in particular, of the blade 14) between the aforementioned first position and the aforementioned second position and is configured to change the vibration frequency and/or time of said vibrating element 15 of the respective distribution element 12, independently of the others, so as to change the quantity of the further type of powder material CP fed by the correction unit 25 along the transverse direction B. In this way, the correction unit 25 will exert a differentiated and controlled correction action on the layer S of powder material CP applying the further type of powder material CP only where it is needed (as schematically shown for example in FIG. 11).

More particularly, the control device of the correction unit 25 is configured to control the digital correction device 32 (in particular, the further actuators 13 of the digital correction device 32 each independently of the other) so as to increase the height (namely, the thickness or the level) of the layer S of ceramic powder CP in the areas in which the detection unit 22 has detected height lower than a (desired) reference height or in any case lower than the height of the other areas of the layer S of ceramic powder CP.

According to some advantageous but not limiting embodiments not shown, the digital correction device 32 coincides with one of the digital feeding devices 9 of the feeding assembly 8.

Figure 8:
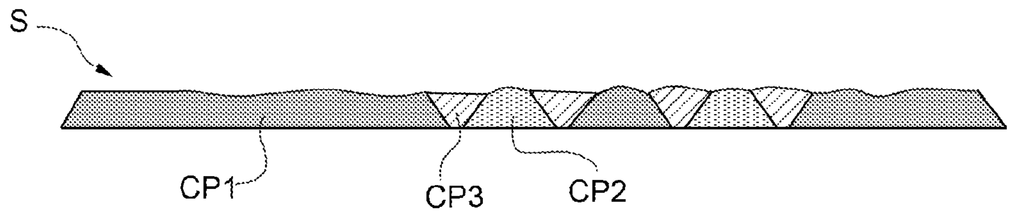
FIG. 8 shows a cross-sectional view, made along section A-A of FIGS. 6 and 7, of a layer of powder material manufactured with the system of FIGS. 6 and 7.

According to alternative advantageous but not limiting embodiments, the correction unit 25 comprises a suction device 33 which is arranged above the conveyor assembly 5, at the correction station 26, extends along a further direction B transverse (in particular, perpendicular) to the moving direction A, and is configured to exert on the layer S of powder material CP a suction action (schematically represented with a plurality of arrows in FIGS. 6, 7 and 13) with a variable intensity along the direction B to suck at least a part of the powder material CP of the layer S of powder material CP so as to make the height (namely, the thickness or the level) of the layer S of powder material CP along the direction B as uniform as possible (i.e. make it as constant as possible) (see in particular FIG. 8). In detail, the suction device 33 is configured to suck different quantities of powder material CP along the direction B, depending on the data detected by the detection unit 22.

More particularly, the control device of the correction unit 25 is configured to control the suction device 33 so as to decrease the thickness of the layer of ceramic powder CP of areas in which the detection unit 22 has detected a height (namely, a thickness or a level) greater than a (desired) reference height or otherwise greater than the height of the other areas.

According to some embodiments (such as the ones shown in FIGS. 6, 7 and 13), the suction device 33 is vertically movable with respect to the conveyor assembly 5 (in particular to the upper conveyor device 16, when the conveyor assembly 5 is provided with an upper conveyor device 16 and with a lower conveyor device 17—like in the embodiments shown in FIGS. 2, 3, 6, 9 and 13 or to the conveyor device 17', when the conveyor assembly 5 consists of a single conveyor device 17', like in the embodiments shown in FIGS. 4, 7 and 10) and can be inclined around a rotation axis (not shown) and parallel to the moving direction A in order to adjust the intensity of the suction action along the direction B, depending on the data detected by the detection unit 22. Alternatively, the suction device 33 could comprise a plurality of suction units (independent of each other) arranged in succession along the direction B and each can be operated by the control device of the correction unit 25 independently of the others depending on the data detected by the detection unit 22 in order to differentially change the correction action, in particular the suction action exerted by the suction device 33.

According to alternative non-limiting and not shown embodiments, the compaction device 2 could be a discontinuous device, for example a discontinuous press. In this case, in an advantageous but not limiting way, the conveyor assembly 5 comprises a further conveyor device (not shown) so that the layer S of powder material CP, after being corrected by the height correction unit 25, and possibly after passing inside the discharge device 18, is conveyed onto said further conveyor device, where it is compacted, for example by means of the above-mentioned discontinuous press 2.

According to some non-limiting embodiments (such as the one shown in FIG. 1), the system 1 to manufacture ceramic articles T further comprises a cutting assembly 34 arranged at a cutting station 35 downstream of the compaction station 3 along the given path P and configured to cut crosswise the layer of compacted powder KP so as to obtain slabs L each having a portion of the layer of compacted powder KP. More particularly, advantageously but not necessarily, the cutting assembly 34 comprises at least one cutting blade 36, which is configured to come into contact with the layer of compacted powder KP and to cut it crosswise.

In an advantageous but not limiting way, the system 1 to manufacture ceramic articles T also comprises at least one firing furnace 37 for sintering the layer of compacted powder KP of the slabs L in order to obtain the ceramic articles T. More particularly, the firing furnace 37 is arranged along the given path P upstream of the output station 7.

In an advantageous but not limiting way, the conveyor assembly 5 comprises at least one further conveyor device, in an advantageous but not limiting way with rollers (as schematically shown in FIG. 1), arranged downstream of the lower conveyor device 17 (when the conveyor assembly 5 comprises an upper conveyor device 16 and a lower conveyor device 17—like in the embodiments shown in FIGS. 1, 2 and 4) or of the conveyor device 17' (when the conveyor assembly 5 consists of a single conveyor device 17', like in the embodiment shown in FIG. 4A) which is configured to transport the slabs L exiting the cutting station 35 through the firing furnace 37 to the output station 7.

According to a further aspect of the present invention, a method to manufacture ceramic articles T, in particular ceramic slabs or tiles, is proposed.

The method comprises the following steps: a compaction step, advantageously but not necessarily implemented by means of a compaction device 2 such as the one described above (even more in an advantageous but not limiting way by means of a compaction device 2 of a continuous type such as the one described above), during which compaction step a powder material CP comprising ceramic powder is compacted at a compaction station 3 so as to obtain a layer of compacted powder KP; and a conveying step, during which the powder material CP is conveyed (in an advantageous but not limiting way in a substantially continuous manner) by a conveyor assembly 5, along a given path P in a moving direction A from an input station 6 to a compaction station 3 and the layer of compacted powder KP is conveyed, along the same given path P, from said compaction station 3 to an output station 7.

Advantageously, but not in a limiting manner, during such a conveying step, the conveyor assembly 5 transports the powder material CP from the input station 6 in a moving direction A.

Even more particularly, in an advantageous but not limiting way, the conveying step is implemented by means of a conveyor assembly 5 made according to one of the variants described above.

In detail, in an advantageous but not limiting way (according to some embodiments such as the ones shown in FIGS. 13 and 14), the conveying step comprises a first conveying sub-step, which is at least partially simultaneous with the feeding step and the height correction step, during which the layer S of powder material CP is conveyed along a first segment PA of the path P by an upper conveyor device 16 (in particular, from the input station 6 up to the discharge station 10); a second conveying sub-step, which is at least partially simultaneous with the compaction step, during which the layer S of powder material CP is conveyed along a second segment PB of the given path P (from the discharge station 10 to the compaction station 3) by a lower conveyor device 17, arranged at a lower height than the upper conveyor device 16 (as explained above with reference to the system 1 to manufacture ceramic articles T); and a discharging sub-step, during which the layer S of powder material CP is conveyed from the upper conveyor device 16 to the lower conveyor device 17.

In an advantageous but not limiting way, the method to manufacture ceramic articles T further comprises a first feeding step, which is at least partially simultaneous with the conveying step, during which at least a first digital feeding device 9' feeds a first type of powder material CP1 onto the conveyor assembly 5 at a first defined area Z1 of the feeding station 6 so that at least a second defined area Z2 remains without the first type of powder material CP1; and at least one second feeding step, which is at least partially simultaneous with the conveying step and at least partially subsequent to the first feeding step, during which at least one second digital feeding device 9" feeds a second type of powder material CP2, which is advantageously different from the first type of powder material CP1, onto the conveyor assembly 5 at least at a third defined area Z3, which is comprised in (in particular, is at least partially coincident with) the second defined area Z2, so as to form a layer S of powder material CP reproducing a defined pattern (see FIGS. 13, 14, 14A, 15 and 15A-15D).

In an advantageous but not limiting way, the method to manufacture ceramic articles T further comprises a feeding step, which is at least partially simultaneous with the conveying step, during which the powder material CP is fed onto the conveyor assembly 5 by a feeding assembly 8 so as to generate a layer S of powder material CP.

Advantageously, the feeding assembly 8 is analogous to that described above with reference to the system 1 to manufacture ceramic articles T, i.e. it comprises a plurality of digital feeding devices 9, each made as explained above, i.e. comprising at least one container 10, which is configured to contain a respective type of powder material CP (for example in the case shown in the accompanying Figures CP1 or CP2 or CP3) and has a respective output mouth 11, whose longitudinal extension is transverse (in particular, perpendicular) to the moving direction A, a plurality of distribution elements 12, which are arranged in succession along the respective output mouth 11, and a plurality of actuators 13, each configured to move a respective distribution element 12 between a first position and a second position, in which the respective type of powder material CP is allowed to pass (in particular, come out) through the area of the output mouth 11 where the respective further distribution element 12 is arranged.

In detail, the same considerations as above with reference to the system 1 for feeding ceramic articles T apply to these digital feeding devices 9.

Advantageously but not necessarily (as already explained above in relation to the system 1 to manufacture ceramic articles T), during the feeding step at least a first digital feeding device 9 of the feeding assembly 8 feeds a first type of powder material CP1 onto a first area of the conveying assembly 5, at the input station 6, and at least a second digital feeding device 9 or 9" of the feeding assembly 8 feeds a second type of powder material CP2, which is different from the first type of powder material CP1, onto a second area of the conveyor assembly 5, at the input station 6, which is (at least partially) different from the first defined area Z1, so as to create a layer S of powder material CP having a defined pattern.

According to some advantageous but not limiting embodiments (as mentioned above with reference to the system 1 to manufacture ceramic articles T), during said feeding step the second digital feeding device 9" of the feeding assembly 8 feeds the second type of powder material CP2 so that the aforementioned third defined area Z3 is side-by-side in contact with said first defined area Z1 along at least one lateral edge B1 of the first area Z1. Furthermore, in an advantageous but not limiting way, the lateral edge B1 extends parallel to the moving direction A so that said third defined area Z3 extends parallel to said lateral edge B1 of the first area Z1 in the direction B.

According to some advantageous but not limiting embodiments (such as those represented in FIGS. 15, 15A, 15B, 15C and 15D), the method provides for further feeding steps, which are (at least partially) simultaneous with the conveying step and at least partially subsequent to the first feeding step, during which further digital feeding devices 9 (for example, in the cases shown in FIGS. 4 and 4A, the aforementioned digital feeding devices 9'" and 9IV) feed further types of powder material (similar to or different from the first and second types of powder material CP1, CP2) onto the conveyor assembly 5 at respective defined areas Z4, Z5, comprised in the second defined area Z2 (in particular, at least partially coincident with the second defined area Z2) and side-by-side in contact, respectively, with the third defined area Z3 along at least one lateral edge B2 of the third defined area Z3, and with the fourth area Z4 along at least one edge B3 of the fourth defined area Z4 so as to form a layer S of powder material CP reproducing a defined pattern. In an advantageous but not limiting way, the method may also comprise a final feeding step during which again a further digital feeding device 9V feeds onto the conveyor assembly 5 a further type of powder material at the remaining part of the second defined area Z2, i.e. on the empty spaces left by the remaining digital feeding devices 9 (see FIG. 15).

According to other advantageous but not limiting embodiments of the invention (such as the ones shown in FIGS. 13 and 13B), during the second feeding step, the second digital feeding device 9" feeds the second type of powder material CP2 so that the third defined area Z3 is adjacent to the first defined area Z1 and is conformed so that at least a part P1 of the second defined area Z2 remains without the second type of powder material CP2. In particular, in an advantageous but not limiting way, this part P1 of the second defined area Z2 is interposed between the first defined area Z1 and the third defined area Z3 (or if there are other areas, between the first defined area Z1 and the possible further closer area Z4, 75 that is adjacent thereto).

In this case, in an advantageous but not limiting way, the conveying step comprises (as explained above) the first conveying sub-step (implemented by means of the above-described upper conveyor device 16) the second conveying sub-step (implemented by means of the above-described lower conveyor device 17) and the discharging sub-step (implemented by means of the above-described discharge assembly 18), which discharging step, in this case, comprises a levelling step, during which the first type of powder material CP1 and/or said second type of powder material CP2 (while crossing the discharge channel 20) occupy the above-described part P1 of the second defined area Z2 so as to discharge onto the lower conveyor device 17 a substantially continuous layer S of powder material CP i.e. without the above-mentioned part P1 without powder material CP as explained in greater detail above) and having a defined height reproducing a defined pattern.

In an advantageous but not limiting way, the method further comprises a detection step at least partially subsequent to the feeding step, during which the height of the powder material CP (in particular, of the layer S of the powder material CP) in the conveyor assembly 5 is detected, and a correction step, which is at least partially subsequent to the detection step and prior to the compaction step, during which a height correction unit 22 changes the height (namely, the thickness or the level) of the layer S of powder material CP crosswise to the moving direction A, depending on the data detected during the detection step.

In detail, in an advantageous but not limiting way, during the detection step a detection unit 22 arranged upstream of the compaction device 2 along the given path P detects the height of the powder material CP in the conveyor assembly 5, and during the height correction step, a height correction unit 25 arranged at a correction station 26, upstream of the detection unit 22 and of the compaction device 2 along the given path P changes the height of the layer S of powder material CP crosswise to the moving direction A, depending on the data detected during the detection step so as to make the height of said layer S of material more constant crosswise to said moving direction A (as already explained above in relation to the system 1 to manufacture ceramic articles T).

According to some advantageous but not limiting embodiments, the correction step comprises a suction step, during which a suction device 33 which extends along the direction B transverse (in particular, perpendicular) to the moving direction A exerts on the layer S of powder material CP a suction action with a variable intensity along the direction B to suck at least a part of the powder material CP in this way the suction device 33 sucks different quantities of the powder material CP along the direction B, depending the data detected by the detection unit 22 during the detection step.

In an advantageous but not limiting way, the suction device 33 is of the type described above with reference to the system 1 to manufacture ceramic articles T and the same considerations as above apply to it.

According to other embodiments of the method to manufacture ceramic articles T, during the correction step, an quantity of at least one further type of powder material CP (which may be similar to or different from the aforementioned first type of powder material CP1 and second type of powder material CP2) is fed onto the layer S of powder material CP, the quantity of which varies along the direction B depending on the data detected by the detection unit 22, in particular so as to make the height (namely, the thickness or the level) of the layer S of powder material CP more uniform along the direction B. In detail, according to some advantageous but not limiting embodiments, in this case, during the height correction step a levelling device 27 feeds the aforementioned quantity of at least one further type of powder material CP onto the layer S of powder material CP.

Figure 14:
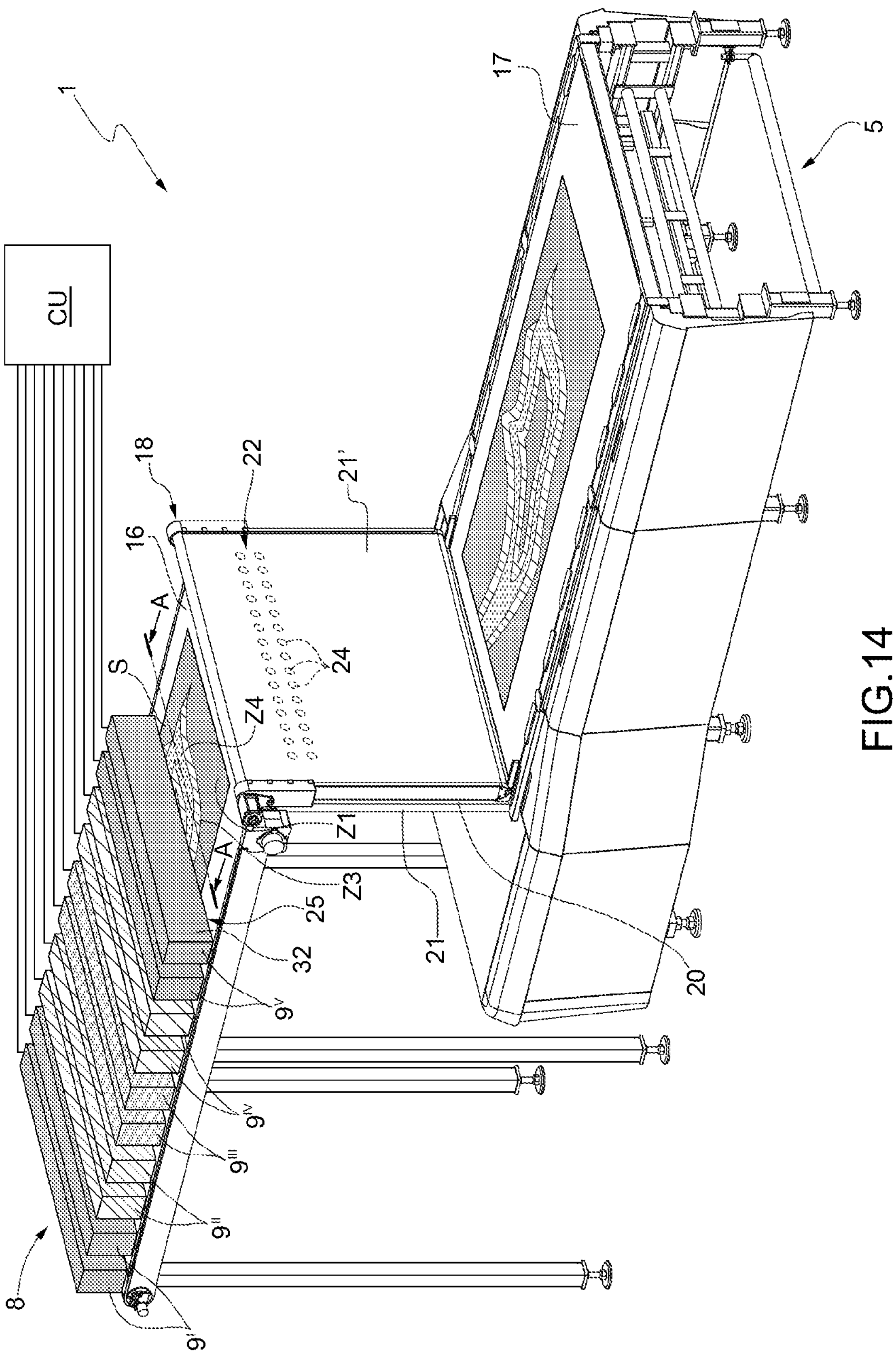
Figure 14A:
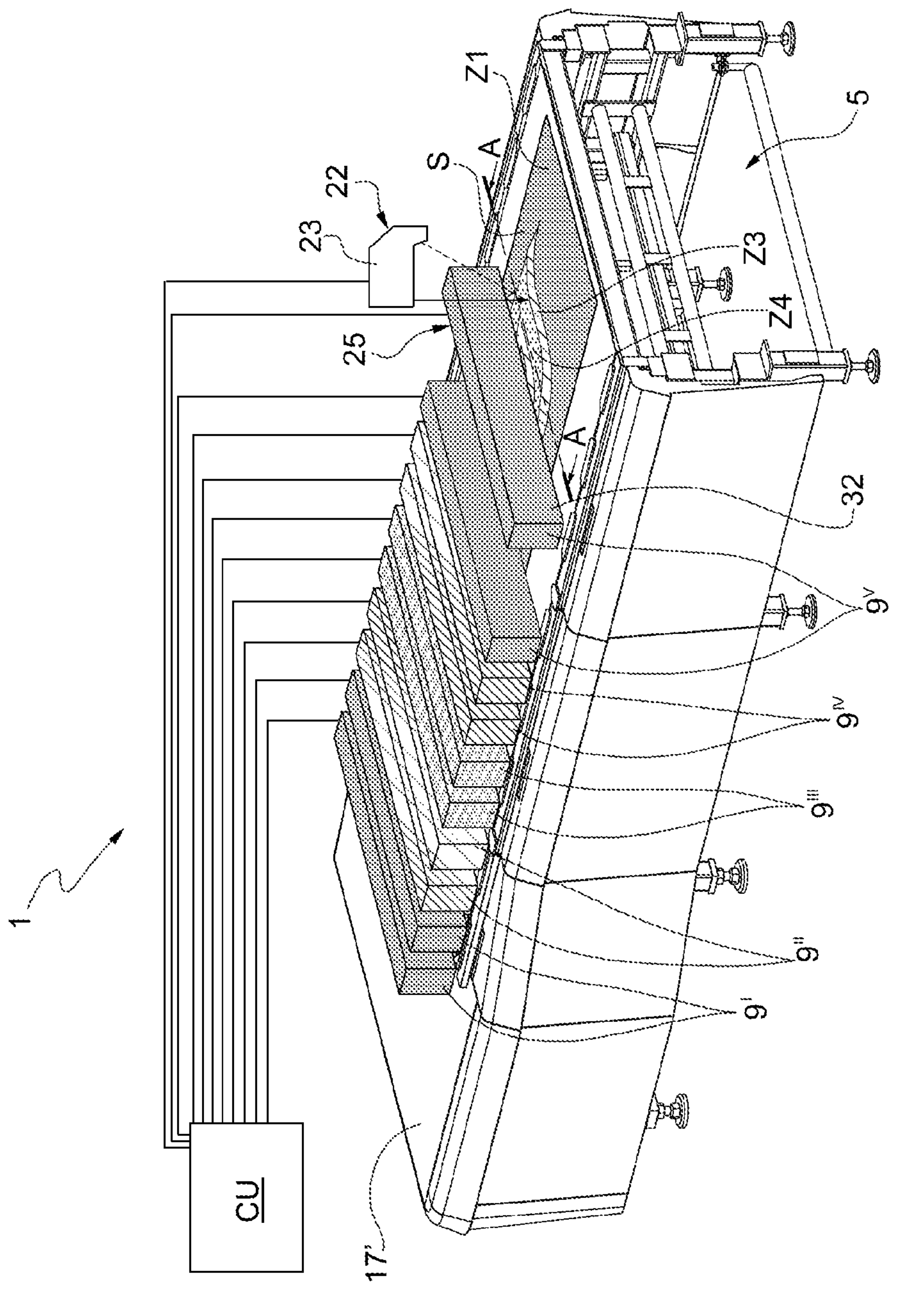
Figure 15C:
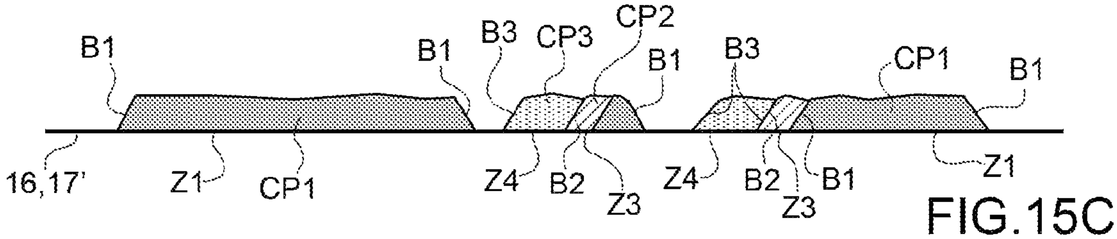
Figure 15D:
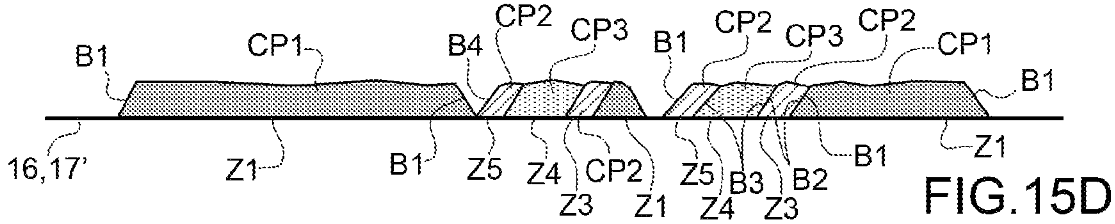
Figure 15:
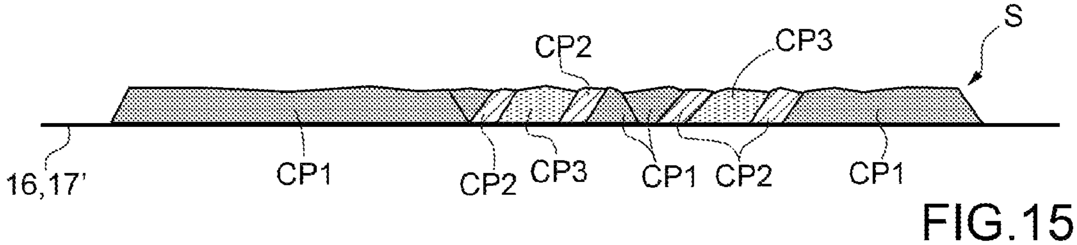
FIG. 15 schematically shows a side view, along section A-A of FIG. 14 or 14A, of a layer of powder material manufactured by means of the system to manufacture ceramic article of FIG. 14 or 14A.

According to other advantageous non-limiting embodiments, during the height correction step, some further powder material CP is fed by means of at least one digital correction device 32 (in an advantageous but not limiting way of the type described above), which may coincide with one of the digital feeding devices 9 of the feeding assembly 8 (like in the non-limiting embodiments shown in FIGS. 14 and 14A).

In an advantageous but not limiting way, the levelling device 27 is of the type described above with reference to the system 1 to manufacture ceramic articles T and the same considerations as above apply to it.

Alternatively (as mentioned above with reference to the system 1) during the height correction step it comprises, the above-mentioned quantity of at least one further type of powder material CP on the layer S of powder material CP is fed by means of at least one digital correction device 32; in other words, the levelling device 27 that feeds the above-mentioned quantity of at least one further type of powder material CP onto the layer S of powder material CP comprises (in particular coincides with) at least one at least one digital correction device 32. Such a digital correction device 32 is, advantageously but not necessarily, of the type described above with reference to the system 1 to manufacture ceramic articles T and the same considerations as above apply to it. Again, in an advantageous but not limiting way, the digital correction device 32 with which the thickness correction step is implemented coincides with one of the digital feeding devices 9 of the feeding assembly 8 that feeds the powder material CP during the feeding step.

According to some advantageous but not limiting embodiments, the conveying step comprises a first conveying sub-step, which is at least partially simultaneous with the feeding step and the height correction step, during which the layer S of powder material CP is conveyed along a first segment PA of the path P by an upper conveyor device 16 (in particular, from the input station 6 up to the discharge station 10); a second conveying sub-step, which is at least partially simultaneous with the compaction step, during which the layer S of powder material CP is conveyed along a second segment PB of the given path P (from the discharge station 10 to the compaction station 3) by a lower conveyor device 17, arranged at a lower height than the upper conveyor device 16 (as explained above with reference to the system 1 to manufacture ceramic articles T); and a discharging sub-step, during which the layer S of powder material CP is conveyed from the upper conveyor device 16 to the lower conveyor device 17.

In an advantageous but not limiting way, in this case, the feeding step and the correction step are at least partially simultaneous with the first conveying sub-step, while the compaction sub-step is at least partially simultaneous with the second conveying sub-step.

Furthermore, according to some advantageous but not exclusive embodiments, in this case, (i.e. when the conveying step comprises the first conveying sub-step, the second conveying sub-step and the discharging sub-step), the detection step, which advantageously is implemented a plurality of sensors arranged in the discharge assembly 18 (as described above in more detail with reference to the system 1) is at least partially simultaneous with the discharging sub-step.

In an advantageous but not limiting way, the discharge assembly 18 is similar to that described above with reference to the system 1 to manufacture ceramic articles and the same considerations as above also apply to it.

In an advantageous but not limiting way, the method to manufacture ceramic articles T further comprises a cutting step, at least partially subsequent to the compaction step, during which a cutting assembly 34 (in an advantageous but not limiting way of the type described above with reference to the system 1 to manufacture ceramic articles T) cuts crosswise the layer of compacted powder KP so as to obtain slabs L each of which has a portion of the layer of compacted powder KP. In an advantageous but not limiting way, the method to manufacture the ceramic articles T also comprises a firing step, at least partially subsequent to the cutting step, during which the layer of compacted powder KP of the slabs L is sintered in order to obtain the ceramic articles T.

The method to manufacture ceramic articles T and the system 1 to manufacture ceramic articles T of the present invention have a number of advantages, including the following ones.

Firstly, the method to manufacture ceramic articles T and the system 1 to manufacture ceramic articles T by allowing a precise correction of the height (in particular of the thickness, namely of the level) of the layer S of powder material CP prior to compaction, allow minimising the risk that any unevenness in height of the layer S of powder material CP may lead to damage during the compaction and/or firing step, compromising the aesthetic appearance of the ceramic articles T.

Furthermore, the use of a feeding assembly 8 comprising digital feeding devices 9 such as those described above, allows for a more precise control of the feeding of the powder material CP, which allows to increase, compared to the known methods and systems, the aesthetic effects that can be reproduced on the layer S of powder material CP, thus allowing to obtain ceramic articles T that more faithfully reproduce (compared to the known methods and systems to manufacture ceramic articles T) the appearance of natural stones or wood.

The following aspects of the invention are also provided (alternatively or additionally).

1. A method to manufacture ceramic articles (T), in particular ceramic slabs or tiles, the method comprises the following steps:

a compaction step, during which a powder material (CP) comprising ceramic powder is compacted, at a compaction station (3), so as to obtain a layer of compacted powder (KP);

a conveying step, during which said powder material (CP) is conveyed by a conveyor assembly (5) along a given path (P) in a moving direction (A) from an input station (6) to the compaction station (3) and said layer of compacted powder (KP) is conveyed, along said given path (P), from said compaction station (3) to an output station (7);

a first feeding step, which is at least partially simultaneous with said conveying step, during which at least one first digital feeding device (9') feeds a first type of powder material (CP1) onto said conveyor assembly (5) at a first defined area (Z1) of said feeding station (6) so that at least a second defined area (Z2) remains without said first type of powder material (CP1);

at least one second feeding step, which is at least partially simultaneous with said conveying step and at least partially subsequent to said first feeding step, during which at least one second digital feeding device (9") feeds a second type of powder material (CP2), different from said first type of powder material (CP1), onto said conveyor assembly (5) at least at a third defined area (Z3) of said feeding station (6), said third defined area (Z3) is comprised in said second defined area (Z2), so as to form a layer (S) of powder material (CP) reproducing a defined pattern;

said first digital feeding device (9') and said at least one second digital feeding device (9") comprising: a respective container (10), which is suited to contain, respectively, said first type of powder material (CP1) and said second type of powder material (CP2) and has a respective output mouth (11), whose longitudinal extension is transverse (in particular, perpendicular) to the moving direction (A), a plurality of distribution elements (12), which are arranged in succession along the output mouth (11) and a plurality of actuators (13), each of which is configured to move a respective distribution element (12) at least between a first position and a second position, in which the first type of powder material (CP1) or the second type of powder material (CP2), respectively, are allowed to pass (in particular, come out) through the area of the output mouth (11) where the respective distribution element (12) is arranged.

2. The method to manufacture ceramic articles (T) according to aspect 1, wherein during said at least one second feeding step, said at least one second digital feeding device (9") feeds said second type of powder material (CP2) so that said at least one third defined area (Z3) is side-by-side in contact with said first defined area (Z1) along at least one lateral edge (B1) of the first area (Z1).

3. The method to manufacture ceramic articles (T) according to aspect 2, wherein said conveying step comprises: a first conveying sub-step, which is at least partially simultaneous with said first feeding step and at least a second feeding step, during which a first conveyor device (16) conveys said layer (S) of powder material (CP) along a first segment (PA) of said path (P); a second conveying sub-step, during which a second conveyor device (17) which is arranged at a lower height than said first conveyor device (16) conveys said layer (S) of powder material (CP) along a second segment (PB) of said given path (P) downstream of said first segment (PA); and a discharging sub-step, during which a discharge assembly (18), which is arranged immediately downstream of said first conveyor device (16) and immediately upstream of said second conveyor device (17) along said given path (P), conveys said powder material (CP) from said first conveyor device (16) to said second conveyor device (17);

said discharge assembly (18) comprising a substantially vertical discharge channel (20) which is arranged and configured to receive said layer (S) of powder material (CP) from said first conveyor device (16) and to discharge it onto said second conveyor device (17).

4. The method to manufacture ceramic articles according to aspect 1, wherein:

during said at least one second feeding step, said at least one second digital feeding device (9") feeds said second type of powder material (CP2) so that said at least one third defined area (Z3) is adjacent to said first defined area (Z1) and is conformed so that at least a part (P1) of said second defined area (Z2) remains without said second type of powder material (CP2);

said conveying step comprises: a first conveying sub-step, which is at least partially simultaneous with said first feeding step and said at least one second feeding step, during which a first conveyor device (16) conveys said layer (S) of powder material (CP) along a first segment (PA) of said given path (P); a second conveying sub-step, which is at least partially simultaneous with said compaction step, during which a second conveyor device (17), which is arranged at a lower height than said first conveyor device (16), conveys said layer (S) of powder material (CP) along a second segment (PB) of said given path (P) downstream of said first segment (PA); and a discharging sub-step, during which a discharge assembly (18), which is arranged immediately downstream of said first conveyor device (16) and immediately upstream of said second conveyor device (17) along said given path (P), conveys said layer (S) of powder material (CP) from said first conveyor device (16) to said second conveyor device (17); and a discharging sub-step, during which a discharge assembly (18), arranged immediately downstream of said first conveyor device (16) and immediately upstream of said second conveyor device (17) along said given path (P), conveys said powder material (CP) from said first conveyor device (16) to said second conveyor device (17);

said discharge assembly (18) comprising a substantially vertical discharge channel (20) which is arranged and configured to receive said layer (S) of powder material (CP) from said first conveyor device (16) and to discharge it onto said second conveyor device (17);

said discharging sub-step comprises a levelling step, during which said first type of powder material (CP1) and/or said second type of powder material (CP2) occupy said at least one part (P1) of said second defined area (Z2) so as to discharge onto said second conveyor device (17) a layer (S) of powder material (CP) that is substantially continuous and having a defined height reproducing a defined pattern.

5. The method to manufacture ceramic articles according to any one of the preceding aspects, comprising:

a detection step at least partially subsequent to said feeding step, during which a detection unit (22) arranged at said ( ) detects the height of said powder material (CP) in the conveyor assembly (5); and a height correction step, which is at least partially subsequent to said detection step and prior to said compaction step, during which a height correction unit (25) modifies the height of said layer (S) of powder material (CP) crosswise to said moving direction (A), depending on the data detected during said detection step.

6. The method to manufacture ceramic articles according to aspect 5, wherein said height correction step comprises a suction step, during which a suction device (33), which extends along a further direction (B) transverse (in particular, perpendicular) to said moving direction (A), exerts, upon said layer (S) of powder material (CP), a suction action with a variable intensity along said further direction (B) so as to suck at least part of said powder material (CP).

7. The method to manufacture ceramic articles according to aspect 5, wherein, during said height correction step, at least one digital correction device (32) feeds a quantity of at least one further type of powder material (CP) onto said layer (S) of powder material (CP) and changes said quantity of said at least one further type of powder material (CP) that it feeds along said further direction (B), depending on the data detected by said detection unit (22);

the digital correction device (32) comprising, in turn, a container (10), which contains the at least one further type of powder material (CP) and has a further output mouth (11), whose longitudinal extension extends along a direction (B) transverse (in particular, perpendicular) to the moving direction (A), a plurality of further distribution elements (12), which are arranged in succession along the further output mouth and a plurality of further actuators (13), each of which moves, depending on the data detected by said detection unit (22), a respective distribution element (12) between a first position and a second position, in which said further type of powder material (CP) is allowed to pass (in particular, come out) through the area of the further output mouth (11) in which the respective distribution element (12) is arranged;

in particular, said height correction step coinciding with said first feeding step or with said second feeding step and said further type of powder material (CP) coincides with said first type of powder material (CP1) or with said second type of powder material (CP2); in particular, said at least one digital correction device coinciding with one of the digital feeding devices (9) of said feeding assembly (8).

8. A system (1) to manufacture ceramic articles (T), in particular ceramic slabs or tiles; said system (1) comprises:

a compaction device (2), which is arranged at a compaction station (3) and is configured to compact a powder material (CP) comprising ceramic powder in order to obtain a layer of compacted powder (KP);

a conveyor assembly (5) to transport said powder material (CP) along a given path (P) in a moving direction (A) from an input station (6) to said compaction station (3) and the layer of compacted powder (KP) from the compaction station (3) to an output station (7);

a feeding assembly (8), which is arranged above the conveyor assembly (5) at said input station (6) and comprising, in turn, at least a first digital feeding device (9') configured to feed a first type of powder material (CP1) at a first defined area (Z1) of said input station (6) so that at least a second defined area (Z2) of said input station (6) remains without said first type of powder material (CP1) and at least one second digital feeding device (9") configured to feed a second type of powder material (CP2), different from the first type of powder material (CP1), onto said conveyor assembly (5) at least at one third defined area (Z3) of said input station (6), which is comprised in (in particular, is at least partially coincident with) said second defined area (Z2), so as to form a layer (S) of powder material (CP) reproducing a defined pattern;

said first digital feeding device (9') and said at least one second digital feeding device (9") comprising: a respective container (10), which is suited to contain, respectively, said first type of powder material (CP1) and said second type of powder material (CP2) and has a respective output mouth (11), whose longitudinal extension is transverse (in particular, perpendicular) to the moving direction (A), a plurality of distribution elements (12), which are arranged in succession along the output mouth (11) and a plurality of actuators (13), each of which is configured to move a respective distribution element (12) between a first position and a second position, in which the type of powder material (CP1) or the second type of powder material (CP2), respectively, are allowed to pass (in particular, come out) through the area of the output mouth (11) where the respective distribution element (12) is arranged.

9. The system (1) according to aspect 8, comprising a computerised control unit (CU) which is configured to control said feeding assembly (8) (in particular, at least said second digital feeding device (9")) so that said at least one third defined area (Z3) is side-by-side in contact with said first defined area (Z1) along at least one lateral edge (B1) of the first area (Z1).

10. The system (1) according to aspect 9, wherein:

said conveyor assembly (5) comprises a first conveyor device (16), which extends along a first segment (PA) of said path (P), a second conveyor device (17), which is arranged at a lower height than said first conveyor device (16) and extends along a second segment (PB) of said given path (P) downstream of the first segment (PA), and a discharge assembly (18), which is arranged immediately downstream of said first conveyor device (16) and immediately upstream of said second conveyor device (17) along said given path (P) and comprising a substantially vertical discharge channel (20) configured to receive said layer (S) of powder material (CP) from said first conveyor device (16) and to discharge it onto said second conveyor device (17).

11. The system (1) according to aspect 8, comprising: a computerised control unit (CU) configured to control said feeding assembly (5) (in particular, at least said second digital feeding device (9")) so that said at least one third defined area (Z3) is adjacent to said first defined area (Z1) and is conformed so that at least a part (P1) of said second defined area (Z2) remains without said second type of powder material (CP2);

said conveyor assembly (5) comprises a first conveyor device (16) which extends along a first segment (PA) of said path (P), a second conveyor device (17) which is arranged at a lower height than said first conveyor device (16) and extends along a second segment (PB) of said given path (P) downstream of the first segment (PA), and a discharge assembly (18) which is arranged immediately downstream of said first conveyor device (16) and immediately upstream of said second conveyor device (17) along said given path (P) and comprising a substantially vertical discharge channel (20) configured to receive said layer (S) of powder material (CP) from said first conveyor device (16) and discharge it onto said second conveyor device (17) so as to induce said first type of powder material (CP1) and/or said second type of powder material (CP2) to occupy said at least a part (P1) of said second defined area (Z2) so as to obtain a layer (S) of powder material (CP) as output from said discharge assembly (18) that is substantially continuous and having a defined height reproducing a defined pattern.

12. The system (1) according to aspect 10 or 11, wherein:

said discharge assembly (18) comprises a substantially vertical wall (21) extending below said first conveyor device (16) and above said second conveyor device (17) and a conveyor belt (21') parallel to and is facing the substantially vertical wall (21) and at a given distance from said wall (21); and said substantially vertical wall (21) is inclined by an angle varying between about 0° and about 30° with respect to the vertical.

13. The system (1) according to any one of aspects 8 to 12, comprising: a detection unit (22), which is arranged upstream of the compaction device (2) along said given path (P) and is configured to detect the height of the powder material (CP) in the conveyor assembly (5); and a height correction unit (25) which is arranged at a correction station (26), upstream of the detection unit (22) and of the compaction device (2) along said given path (P), and is operable to change the height of the layer (S) of powder material (CP) crosswise to said moving direction (A), depending on the data detected by said detection unit (22) so as to make the height of the layer (S) of material more constant crosswise to said moving direction (A).

14. The system (1) according to aspect 13, wherein the height correction unit (25) comprises (in particular, consists of) a suction device (33), which is arranged above said conveyor assembly (5) at said correction station (26), extends along a further direction (B) transverse (in particular, perpendicular) to said moving direction (A) and is configured to exert, upon said layer (S) of powder material (CP), a suction action with a variable intensity along said direction (B) so as to suck at least a part of said material of ceramic powder (CP).

15. The system (1) according to aspect 13, wherein: said height correction unit (25) is configured to feed a further type of powder material (CP) to the conveyor assembly (5) and comprises (in particular, consists of) at least one digital correction device (32) arranged above said conveyor assembly (5) at the correction station (26) and comprising, in turn, a further container (10), which is configured to contain the further type of powder material (CP) and has a further output mouth (11), whose longitudinal extension extends along a further direction (B) transverse (in particular, perpendicular) to the moving direction (A), a plurality of distribution elements (12), which are arranged in succession along the further output mouth (11), and a plurality of further actuators (13), each of which is configured to move, depending on the data detected by said detection unit (22), a respective further distribution element (12) between a first position and a second position, in which the further type of powder material (CP) is allowed to pass (in particular, come out) through the area of the further output mouth (11) where the respective further distribution element (12) is arranged.

We claim:

1. A system to manufacture ceramic articles (T), said system comprises:

a compaction device, which is arranged at a compaction station and is configured to compact a powder material (CP) comprising ceramic powder in order to obtain a layer of compacted powder (KP);

a conveyor assembly to transport said powder material (CP) along a given path (P) from an input station to the compaction station and the layer of compacted powder (KP) from the compaction station to an output station;

a feeding assembly, which is configured to feed the powder material (CP) to said conveyor assembly at the input station so as to generate a layer(S) of said powder material (CP);

said conveyor assembly is configured to convey said layer(S) of said powder material (CP) from the input station in a moving direction (A);

said feeding assembly comprises a plurality of digital feeding devices, each comprising, in turn, at least one container, which is configured to contain a respective type of powder material (CP) and has a respective output mouth, whose longitudinal extension is transverse to the moving direction (A), a plurality of distribution elements, which are arranged in succession along the output mouth, and a plurality of actuators, each configured to move a respective distribution element between a first position and a second position, in which the respective type of powder material (CP) is allowed to pass through the area of the output mouth where the respective distribution element is arranged;

the system to manufacture ceramic articles (T) further comprises:

a detection unit, which is arranged upstream of the compaction device along said given path (P) and is configured to detect the height of the powder material (CP) in the conveyor assembly; and a height correction unit, which is arranged at a correction station, upstream of the detection unit and of the compaction device along said given path (P), and can be operated so as to change the height of the layer(S) of powder material (CP) crosswise to said moving direction (A), depending on the data detected by the detection unit in order to make the height of the material layer(S) more constant crosswise to said moving direction (A).

2. The system to manufacture ceramic articles (T) according to claim 1, wherein: each one of said distribution elements comprises a blade, which is arranged so as to allow the respective type of powder material (CP) to accumulate on it; and each one of said actuators has at least one vibrating element, which can be caused to vibrate so as to provoke the vibration of the respective distribution element between at least said first position and said second position in order to allow said powder material (CP) accumulated on the blade to come out.

3. The system to manufacture ceramic articles (T) according to claim 2, wherein each one of said actuators comprises piezoelectric material.

4. The system to manufacture ceramic articles (T) according to claim 1, wherein the height correction unit comprises a suction device, which is arranged above said conveyor assembly at the correction station, extends along a further direction (B) transverse to said moving direction (A) and is configured to exert, upon said layer(S) of powder material (CP), a suction action with a variable intensity along said direction (B) so as to suck at least part of said ceramic powder material.

5. The system to manufacture ceramic articles (T) according to claim 4, wherein said suction device is vertically movable relative to said conveyor assembly and can be inclined around a rotation axis parallel to said moving direction (A) in order to adjust the intensity of said suction action along said further direction (B) depending on the data detected by the detection unit.

6. The system to manufacture ceramic articles (T) according to claim 1, wherein: said height correction unit is configured to feed a further type of powder material (CP) to the conveyor assembly and comprises at least one digital correction device arranged above said conveyor assembly at the correction station and comprising, in turn, a further container, which is configured to contain said further type of powder material (CP) and has a further output mouth, whose longitudinal extension extends along a further direction (B) transverse to the moving direction (A), a plurality of distribution elements, which are arranged in succession along said further output mouth, and a plurality of further actuators, each configured to move, depending on the data detected by said detection unit, a respective further distribution element between a first position and a second position, in which said further type of powder material (CP) is allowed to pass through the area of the further output mouth where the respective further distribution element is arranged.

7. The system to manufacture ceramic articles (T) according to claim 6, wherein:

each of said further distribution elements of said digital correction device comprises a blade, which is arranged so as to allow powder material (CP) to accumulate on it; each one of said further actuators has at least one vibrating element, made of piezoelectric material, which can be caused to vibrate so as to provoke the vibration of the respective further distribution element at least between said first position and said second position; and each of one of said further actuators of said digital correction device is configured to change the vibration frequency and/or time of said at least one vibrating element of the respective further distribution element, regardless of the other ones, so as change the quantity of said further type of powder material (CP) fed by the digital correction device along said transverse direction (B).

8. The system to manufacture ceramic articles (T) according to claim 6, wherein said at least one digital correction device coincides with one of the digital feeding devices of said feeding assembly.

9. The system to manufacture ceramic articles (T) according to claim 1, wherein said height correction unit comprises a levelling device, which is arranged above said conveyor assembly at the correction station, extends along a further direction (B) transverse to said moving direction (A) and is configured to feed a quantity of a further type of powder material (CP) onto said layer(S) of powder material (CP); said levelling device being configured to change said quantity of said further type of powder material (CP) fed onto said layer(S) of powder material (CP) along said direction (B) depending on the data detected by said detection unit.

10. The system to manufacture ceramic articles (T) according to claim 9, wherein said levelling device comprises, in turn: a feeding channel, which is configured to contain said further type of powder material (CP), at least one bulkhead, which develops along said further direction (B), at an open end of said feeding channel, and is arranged above said conveyor assembly so as to delimit at least one passage between said bulkhead and said conveyor assembly, and an operating device, which is configured to change the height of said passage so as to allow said further type of powder material (CP) to come out from said passage.

11. The system to manufacture ceramic articles (T) according to claim 1, wherein:

said conveyor assembly comprises a first conveyor device, which extends along a first segment (PA) of said path (P), a second conveyor device, which is arranged at a lower height than said first conveyor device and extends along a second segment (PB) of said given path (P) downstream of said first segment (PA), and a discharge assembly, which is arranged immediately downstream of said first conveyor device and immediately upstream of said second conveyor device along said given path (P) and comprises a substantially vertical discharge channel, which is configured to receive said layer(S) of powder material (CP) from said first conveyor device and to discharge it onto said second conveyor device;

said input station and said correction station lie along said first segment (PA) of said given path (P); and said compaction station lies along said second segment (PB) of said given path (P).

12. The system to manufacture ceramic articles (T) according to claim 11, wherein said first conveyor device is configured to convey said layer(S) of powder material (CP) along said first segment (PA) in the moving direction (A) and said second conveyor device is configured to convey said layer(S) of powder material (CP) along said second segment (PB) in a direction (C) opposite to the moving direction (A).

13. The system to manufacture ceramic articles (T) according to claim 12, wherein said detection unit comprises a plurality of sensors, each configured to detect the height of said layer(S) of powder material (CP) inside said discharge assembly.

14. The system to manufacture ceramic articles (T) according to claim 1, wherein: said conveyor assembly is configured to transport, in a continuous manner, the powder material (CP) along said given path (P) from the input station to the compaction station; and said compaction device comprises a first compacting belt (2'), which, at the bottom, is in contact with the conveyor assembly at the compaction station, and a second compacting belt (2"), which is arranged above said conveyor assembly at the compaction station and cooperates with the first compacting belt (2') so as to compact said layer(S) of powder material (CP) in a continuous manner in order to obtain a layer of compacted powder (KP).

15. A method to manufacture ceramic articles (T), the method comprises the following steps:

a compaction step, during which a powder material (CP) comprising ceramic powder is compacted, at a compaction station, so as to obtain a layer of compacted powder (KP);

a conveying step, during which said powder material (CP) is conveyed by a conveyor assembly along a given path (P) from an input station to the compaction station and the layer of compacted powder (KP) is conveyed, along said given path (P), from the compaction station to an output station;

a feeding step, which is at least partially simultaneous with said conveying step and during which said powder material (CP) is fed onto said conveyor assembly by means of a feeding assembly so as to generate a layer(S) of said powder material (CP);

said conveyor assembly being configured to convey said layer(S) of said powder material (CP) from the input station in a moving direction (A);

said feeding assembly comprising a plurality of digital feeding devices, each comprising, in turn, at least one container, which is suited to contain a respective type of powder material (CP) and has a respective output mouth, whose longitudinal extension is transverse to the moving direction (A), a plurality of distribution elements, which are arranged in succession along the output mouth, and a plurality of actuators, each configured to move a respective distribution element between a first position and a second position, in which the powder material is allowed to pass through the area of the output mouth where the respective distribution element is arranged;

said method further comprises:

a detection step, which is at least partially subsequent to said feeding step and during which a detection unit, which is arranged upstream of the compaction device along said given path (P) detects the height of said powder material (CP) in the conveyor assembly; and a height correction step, which is at least partially subsequent to said detection step and prior to said compaction step, during which a height correction unit arranged at a correction station, upstream of said detection unit and of said compaction device along said given path (P) changes the height of said layer(S) of powder material (CP) crosswise to said moving direction (A), depending on the data detected during said detection step so as to make the height of said layer(S) of material more constant crosswise to said moving direction (A).

16. The method to manufacture ceramic articles (T) according to claim 15, wherein, during said feeding step, at least one first digital feeding device of the feeding assembly feeds a first type of powder material (CP1) onto a first area of said conveyor assembly, in the area of said input station, and at least one second digital feeding device of the feeding assembly feeds a second type of powder material (CP2), which is different from the first type of powder material (CP1), onto a second area of said conveyor assembly in the area of said input station, which is at least partially different from the first area, so as to create a layer(S) of powder material (CP) having a defined pattern.

17. The method to manufacture ceramic articles (T) according to claim 16, wherein said height correction step comprises a suction step, during which a suction device, which extends along a further direction (B) transverse to said moving direction (A), exerts, upon said layer(S) of powder material (CP), a suction action with a variable intensity along said direction (B) so as to suck at least part of said powder material (CP).

18. The method to manufacture ceramic articles (T) according to claim 16, wherein, during said height correction step, a levelling device feeds a quantity of at least one further type of powder material (CP) onto said layer(S) of powder material (CP) and changes said quantity of said at least one further type of powder material (CP) that it feeds along said further direction (B), depending on the data detected by said detection unit.

19. The method to manufacture ceramic articles (T) according to claim 18, wherein the levelling device comprises at least one digital correction device, said digital correction device comprising, in turn, a container, which contains said at least one further type of powder material (CP) and has a further output mouth, whose longitudinal extension extends along a direction (B) transverse to the moving direction (A), a plurality of distribution elements, which are arranged in succession along said further output mouth, and a plurality of further actuators, each configured to move, depending on the data detected by said detection unit, a respective distribution element between a first position and a second position, in which the powder material is allowed to pass through the area of said further output mouth where the respective distribution element is arranged; said at least one digital correction device coinciding with one of the digital feeding devices of said feeding assembly.

* * * * *